(12) United States Patent
Yamashita et al.

(10) Patent No.: US 12,522,012 B2
(45) Date of Patent: Jan. 13, 2026

(54) AQUEOUS INK, INK JET RECORDING METHOD AND INK JET RECORDING APPARATUS

(71) Applicant: CANON KABUSHIKI KAISHA, Tokyo (JP)

(72) Inventors: Tomohiro Yamashita, Kanagawa (JP); Minako Kawabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 157 days.

(21) Appl. No.: 18/379,721

(22) Filed: Oct. 13, 2023

(65) Prior Publication Data
US 2024/0123749 A1  Apr. 18, 2024

(30) Foreign Application Priority Data

Oct. 18, 2022 (JP) .................. 2022-167228
Sep. 25, 2023 (JP) .................. 2023-160082

(51) Int. Cl.
| | |
|---|---|
| B41J 2/01 | (2006.01) |
| B41J 11/00 | (2006.01) |
| B41M 5/00 | (2006.01) |
| C09D 11/32 | (2014.01) |
| C09D 11/322 | (2014.01) |
| C09D 11/38 | (2014.01) |

(52) U.S. Cl.
CPC ......... *B41M 5/0047* (2013.01); *C09D 11/322* (2013.01); *C09D 11/38* (2013.01)

(58) Field of Classification Search
CPC .... C09D 11/322; C09D 11/38; B41M 5/0047; B41J 2/2107; B41J 2/01; B41J 11/0015
See application file for complete search history.

(56) References Cited

U.S. PATENT DOCUMENTS

| | | |
|---|---|---|
| 7,160,372 B2 | 1/2007 | Yoshizawa |
| 7,208,033 B2 | 4/2007 | Kawabe |
| 7,226,498 B2 | 6/2007 | Yamashita |

(Continued)

FOREIGN PATENT DOCUMENTS

| | | |
|---|---|---|
| EP | 4067085 A1 | 10/2022 |
| JP | 2010-155359 A | 7/2010 |

(Continued)

OTHER PUBLICATIONS

European Search Report issued in corresponding European Application No. 23203132.8 dated Feb. 27, 2024.

*Primary Examiner* — Jason S Uhlenhake
(74) *Attorney, Agent, or Firm* — Venable LLP (57) ABSTRACT

Provided is an aqueous ink for ink jet capable of recording an image, which has abrasion resistance required in a commercial printing field and an industrial printing field and which is suppressed from being changed in glossy feeling when recorded matters are loaded and their recorded surfaces are rubbed against each other. The aqueous ink for ink jet includes a wax, (i) a nonionic dispersant for dispersing the wax and (ii) an anionic dispersant for dispersing the wax. The nonionic dispersant is a compound represented by the general formula (1) and has a HLB value of 9.0 or more to 18.0 or less. The anionic dispersant is a compound having at least one kind of anionic group selected from the group consisting of: a sulfonic acid group; a carboxylic acid group; and a phosphoric acid group.

24 Claims, 1 Drawing Sheet

(56) References Cited

U.S. PATENT DOCUMENTS

| | | |
|---|---|---|
| 7,244,299 B2 | 7/2007 | Tsuji |
| 7,247,194 B2 | 7/2007 | Okamura |
| 7,270,701 B2 | 9/2007 | Jinnou |
| 7,297,194 B2 | 11/2007 | Shinjo |
| 7,297,197 B2 | 11/2007 | Jinnou |
| 7,364,770 B2 | 4/2008 | Nagashima |
| 7,445,666 B2 | 11/2008 | Yanagimachi |
| 7,550,037 B2 | 6/2009 | Mafune |
| 7,611,571 B2 | 11/2009 | Yamashita |
| 7,618,484 B2 | 11/2009 | Fujimoto |
| 7,637,603 B2 | 12/2009 | Kawabe |
| 8,025,722 B2 | 9/2011 | Kawabe |
| 8,070,871 B2 | 12/2011 | Kawabe |
| 8,075,126 B2 | 12/2011 | Yoshizawa |
| 8,343,269 B2 | 1/2013 | Takahashi |
| 8,519,021 B2 | 8/2013 | Ohzeki |
| 8,569,397 B2 | 10/2013 | Ohzeki |
| 8,602,544 B2 | 12/2013 | Kawabe |
| 8,616,695 B2 | 12/2013 | Mori |
| 8,814,341 B2 | 8/2014 | Nagao |
| 8,871,013 B2 | 10/2014 | Sakai |
| 8,998,397 B2 | 4/2015 | Mori |
| 9,562,165 B2 | 2/2017 | Mori |
| 9,574,099 B2 | 2/2017 | Kawabe |
| 10,233,343 B2 | 3/2019 | Takebayashi |
| 10,245,847 B2 | 4/2019 | Matsuzaki |
| 10,253,200 B2 | 4/2019 | Kakikawa |
| 10,603,909 B2 | 3/2020 | Kawabe |
| 10,654,288 B2 | 5/2020 | Nakata |
| 10,723,135 B2 | 7/2020 | Kawabe |
| 10,843,482 B2 | 11/2020 | Aikawa |
| 10,843,483 B2 | 11/2020 | Saito |
| 10,864,747 B2 | 12/2020 | Nakagawa |
| 11,654,693 B2 | 5/2023 | Saito |
| 11,827,033 B2 | 11/2023 | Yamashita |
| 11,833,838 B2 | 12/2023 | Motomura |
| 2010/0166962 A1 | 7/2010 | Ohzeki |
| 2012/0249705 A1 | 10/2012 | Aoki et al. |
| 2013/0158177 A1 | 6/2013 | Ohzeki |
| 2018/0086112 A1 | 3/2018 | Matsuzaki |
| 2018/0273789 A1* | 9/2018 | Matsuzaki ............ C09D 11/54 |
| 2021/0162778 A1 | 6/2021 | Asakawa |
| 2022/0403193 A1 | 12/2022 | Ichikawa et al. |
| 2023/0405990 A1 | 12/2023 | Yamashita |
| 2023/0405993 A1 | 12/2023 | Ishii |

FOREIGN PATENT DOCUMENTS

| | | |
|---|---|---|
| JP | 2015-199788 A | 11/2015 |
| JP | 2018-053124 A | 4/2018 |
| JP | 2019-203044 A | 11/2019 |
| JP | 2021-126859 A | 9/2021 |

* cited by examiner

AQUEOUS INK, INK JET RECORDING METHOD AND INK JET RECORDING APPARATUS

BACKGROUND OF THE INVENTION

Field of the Invention

The present invention relates to an aqueous ink, an inkjet recording method and an ink jet recording apparatus.

Description of the Related Art

An ink jet recording method enables recording on various recording media. In addition, to obtain a more satisfactory image, there have been proposals of various inks in accordance with their purposes, such as an ink suitable for recording an image of photographic quality on, for example, glossy paper and an ink suitable for recording a document on, for example, plain paper.

In recent years, it has been required from the market to perform ink jet recording not only on a dedicated recording medium that has heretofore been used, such as plain paper or glossy paper for ink jet, but also on paper that has heretofore been used in offset printing (e.g., coated paper, uncoated paper or printing paper). In other words, there has been a strong demand for the development of an ink jet technology excelling at high-mix, small-lot printing into a commercial printing field and an industrial printing field in which the offset printing has gone mainstream.

Under such circumstances, simultaneously with a demand for image quality far exceeding that of conventional ink jet recording, high abrasion resistance comparable to that of the offset printing has started to be required.

For example, in Japanese Patent Application Laid-Open No. 2015-199788, there is a proposal of a technology including adding a water-soluble resin to an ink to improve the abrasion resistance of an image and in Japanese Patent Application Laid-Open No. 2018-53124, there is a proposal of a technology including aggregating and fixing an ink through use of a reaction liquid together with the ink. In addition, in each of Japanese Patent Application Laid-Open No. 2010-155359 and Japanese Patent Application Laid-Open No. 2019-203044, there is a proposal of a technology including adding a wax into an ink or a reaction liquid to improve a sliding property, to thereby improve the abrasion resistance of an image.

SUMMARY OF THE INVENTION

The inventors of the present invention have investigated whether or not each of the methods described in Japanese Patent Application Laid-Open No. 2015-199788, Japanese Patent Application Laid-Open No. 2018-53124, Japanese Patent Application Laid-Open No. 2010-155359 and Japanese Patent Application Laid-Open No. 2019-203044 provides an image having abrasion resistance corresponding to that of offset printing required in recent years.

The inventors have found that it is difficult for the method described in Japanese Patent Application Laid-Open No. 2015-199788 to achieve an image having abrasion resistance at the same level as that of the offset printing. The foregoing results from the fact that an ink layer is liable to peel when rubbed with a strong force because such a coated paper as used in the offset printing is free of any fixation layer unlike ink jet-dedicated paper.

In addition, the method described in Japanese Patent Application Laid-Open No. 2018-53124 has not reached the abrasion resistance of an image required in offset printing paper.

Further, the inventors have revealed that the methods described in Japanese Patent Application Laid-Open No. 2010-155359 and Japanese Patent Application Laid-Open No. 2019-203044 each cause another problem. That is, in each of a commercial printing field and an industrial printing field, recorded images (hereinafter also referred to as "recorded matters") may be loaded in a superimposed manner. At that time, the recorded surface of one recorded matter and the recorded surface of another recorded matter loaded to face the former recorded matter or the portion (non-recorded portion) thereof on which no image is recorded are rubbed against each other. The inventors have recognized a new problem in that as a result of the foregoing, the glossy feeling of each of the recorded surfaces changes to move the recorded matter to a level unacceptable as a recorded matter.

Accordingly, an object of the present invention is to provide an aqueous ink for ink jet capable of recording an image, which has abrasion resistance required in a commercial printing field and an industrial printing field and which is suppressed from being changed in glossy feeling when recorded matters are loaded and their recorded surfaces are rubbed against each other. In addition, another object of the present invention is to provide an ink jet recording method and an ink jet recording apparatus each using the aqueous ink.

That is, according to the present invention, there is provided an aqueous ink for ink jet including a wax, (i) a nonionic dispersant for dispersing the wax and (ii) an anionic dispersant for dispersing the wax, wherein the nonionic dispersant comprises a compound represented by the following general formula (1) and has a HLB value of 9.0 or more to 18.0 or less, and wherein the anionic dispersant comprises a compound having at least one kind of anionic group selected from the group consisting of: a sulfonic acid group; a carboxylic acid group; and a phosphoric acid group:

$$R^1—O—(R^2O)_n—H \qquad (1)$$

In the general formula (1), $R^1$ represents an alkyl group or an alkenyl group and the number of carbon atoms thereof is 4 or more to 40 or less, $R^2$s each independently represent an ethyl group, a propyl group or a butyl group and "n" represents the number of moles added of an alkylene oxide and represents 3 or more to 50 or less.

Further features of the present invention will become apparent from the following description of exemplary embodiments with reference to the attached drawings.

DESCRIPTION OF THE EMBODIMENTS

The present invention is described in more detail below by way of exemplary embodiments. In the present invention, when a compound is a salt, the salt is present as dissociated ions in an ink, but the expression "contain a salt" is used for convenience. In addition, an aqueous ink and reaction liquid for ink jet are sometimes referred to simply as "ink" and "reaction liquid". Physical property values are values at room temperature (25° C.), unless otherwise stated. The descriptions "(meth)acrylic acid" and "(meth)acrylate" refer to "acrylic acid or methacrylic acid" and "acrylate or methacrylate", respectively. In the present invention, a "unit" for forming a resin means a repeating unit derived from one monomer.

First, the inventors of the present invention have investigated the abrasion resistance of an image in a recorded matter in detail. When ink jet recording is performed on paper used in offset printing, the incorporation of a wax into an ink is given as one requirement needed for improving the abrasion resistance of the image.

Herein, when the wax is added to an aqueous ink for ink jet, appropriate dispersibility in an aqueous medium needs to be imparted thereto. A method of imparting the dispersibility is not particularly limited. A person in the art can impart the dispersibility in the aqueous medium to the wax through use of a known method. Details about the method are described later.

The inventors of the present invention have investigated the abrasion resistance of an image by adding, to an ink for inkjet, various waxes each having imparted thereto dispersibility in an aqueous medium (hereinafter sometimes simply described as "wax"). As a result, the inventors have obtained the conclusion that the abrasion resistance of the image can reach a level required in recent years without dependence on the kind of a dispersant used for imparting the dispersibility of each of the waxes.

Further, the inventors of the present invention have performed a more severe evaluation assuming a recorded matter obtained by offset printing. Specifically, the following test was performed: a recording medium was subjected to ink jet recording; and another recording medium was brought into close contact with the recorded surface of the former medium and the recording media were rubbed against each other. As a result, the inventors have found that the glossy feeling of the recorded surface may change depending on the kind and amount of the dispersant used for imparting the dispersibility of each of the waxes. Specifically, the inventors have found that when an anionic dispersant is used alone or a nonionic dispersant is used alone, a change in glossy feeling of the recorded surface is remarkable. The inventors have investigated the phenomenon in more detail and have assumed a reason therefor to be as described below.

[Reason why Glossy Feeling Changes]

First, the inventors of the present invention have made a detailed investigation on a case in which an anionic dispersant is used alone for dispersing a wax. An aqueous ink having added thereto the wax was applied to a recording medium by an ink jet recording method to record an image, to thereby produce a recorded matter. The produced recorded matter and another recording medium were brought into close contact with each other and were rubbed against each other. As a result, the glossy feeling of the recorded surface of the former medium changed. According to an investigation made by the inventors of the present invention, such a phenomenon as described below may occur in a portion changed in glossy feeling.

The wax may show such behavior as described below on the recorded surface having recorded thereon the aqueous ink. At the time of the fixation of the ink on the recording medium free of any receiving layer, it was observed with a scanning electron microscope (SEM) that the wax was present under the state of sticking out of the ink layer of the recording medium. The foregoing does not differ from the fact that the sliding property of the surface of a recorded matter produced with the ink including the wax is improved and hence its abrasion resistance reaches a required level.

Meanwhile, when another recording medium is brought into close contact with the wax sticking out of the surface of the ink layer at a position facing the recorded surface and the particle and the recording medium are rubbed against each other, such an event as described below may occur. That is, the upper portion of the wax is rubbed against the other recording medium to be shaved. Thus, the upper portion is brought into a flat state. The flat surface is in the state of reflecting a larger quantity of incident light and probably as a result of this, the glossy feeling changes.

Further, in the wax using the anionic dispersant, the change in glossy feeling is assumed to be remarkable because of such a reason as described below. For example, when the anionic dispersant is a carboxylic acid salt, the carboxylic acid salt expresses its dispersibility in an aqueous medium under an ionized state. More specifically, the following is conceivable: the anionic dispersant is ionized; a moiety having positive charge interacts with the wax and a moiety having negative charge interacts with the aqueous medium; and hence the wax shows a stable dispersed state.

However, the anionic dispersant interacts with the plurality of wax at one time because of its characteristics and hence the wax are fixed under the state of being close to each other. It is said that the wax are liable to have a state in which the particles are close to each other, in other words, a sea-island structure on the recording medium. The inventors of the present invention have assumed that the following is the reason why the change in glossy feeling becomes conspicuous: under a state in which the wax have a sea-island structure, the upper portion of each of the wax is shaved to be brought into the state of reflecting a larger quantity of incident light as described above.

Next, the inventors of the present invention have also made an investigation on a case in which a nonionic dispersant is used alone for dispersing a wax. The wax dispersed with the nonionic dispersant may be slightly reduced in dispersion stability as compared to that in the case of the anionic dispersant. The inventors have found that the positions at which the wax each reduced in dispersion stability are present on the recorded surface of a recording medium are liable to be unevenly distributed. That is, the wax may tend to have a sea-island structure and it is assumed that as a result of this, a change in glossiness of the recorded surface also occurs when the nonionic dispersant is used alone.

[Reason why Change in Glossy Feeling can be Suppressed]

The inventors of the present invention have found that the use of an ink including a wax dispersed by using a specific nonionic dispersant and a specific anionic dispersant in combination can achieve both of the abrasion resistance of an image and the suppression of a change in glossy feeling thereof. The inventors of the present invention have assumed a reason therefor to be as described below.

A compound having at least one kind of anionic group selected from the group consisting of: a sulfonic acid group; a carboxylic acid group; and a phosphoric acid group is used as the anionic dispersant. In addition, a compound represented by the general formula (1), the compound having a HLB value of 9.0 or more to 18.0 or less, is used as the nonionic dispersant. The compound is generally referred to as "polyoxyalkylene alkyl ether" or "polyoxyalkylene alkenyl ether." As in the foregoing, the wax dispersed by using those specific nonionic dispersant and anionic dispersant in combination is present on the surface of a recorded matter under the state of sticking out of the surface of the recorded matter and hence the sliding property of the surface may be secured.

$$R^1—O—(R^2O)_n—H \qquad (1)$$

In the general formula (1), $R^1$ represents an alkyl group or an alkenyl group and the number of carbon atoms thereof is 4 or more to 40 or less, $R^2$s each independently represent an ethylene group, a propylene group or a butylene group and "n" represents the number of moles added of an alkylene oxide and represents 3 or more to 50 or less.

Further, with regard to the change in glossy feeling of the image, the presence of the above-mentioned specific nonionic dispersant is assumed to achieve such a state as described below.

When only the anionic dispersant is used as a dispersant for dispersing the wax, the anionic dispersant interacts with the plurality of wax at one time to establish a state in which the wax are brought close to each other, that is, a so-called sea-island structure. In contrast, when the above-mentioned specific nonionic dispersant is used in combination with the anionic dispersant, the wax are hardly brought close to each other and hence hardly have a sea-island structure. Specifically, a polyoxyalkylene moiety in the molecular structure of the above-mentioned specific nonionic dispersant is present near the wax and hence can suppress approach between the wax occurring through the anionic dispersant. In other words, the wax can be present under the state of being dispersed in the recorded surface of the image without being excessively brought close to each other.

As a result, the change in glossy feeling of the image resulting from the fact that the waxes are brought into close contact with and rubbed against a recording medium may be inconspicuous because even when the wax themselves are shaved to have flat surfaces, to thereby increase the quantity of reflected light, the waxes hardly have a sea-island structure on the recorded matter and are hence dispersed in the recorded surface. As a result, the change in glossy feeling can be suppressed.

In addition, the inventors of the present invention have found that such an effect as described below is also obtained as a secondary effect. That is, when the waxes dispersed by using the above-mentioned specific nonionic dispersant and anionic dispersant in combination are used, the waxes can be caused to exist while being dispersed in the recorded surface. An investigation made by the inventors of the present invention has revealed that as a result of the foregoing, sliding properties resulting from the waxes are not unevenly distributed in the recorded surface but are uniformized to move the abrasion resistance of the image to a higher level. A further investigation made by the inventors of the present invention has found that the above-mentioned effect is not obtained even when a compound corresponding to the above-mentioned nonionic dispersant is added to an ink including a wax dispersed with the anionic dispersant or even when a compound corresponding to the above-mentioned anionic dispersant is added to an ink including a wax dispersed with the nonionic dispersant. In other words, in the present invention, it is important that the wax dispersed with both of the specific nonionic dispersant and anionic dispersant be used.

In addition, as described above, the above-mentioned nonionic dispersant has a HLB value of 9.0 or more to 18.0 or less. When the HLB value is set within the above-mentioned range, the hydrophilicity and hydrophobicity of the nonionic dispersant can be well-balanced to suppress approach between the waxes occurring through the anionic dispersant. When the HLB value deviates from the above-mentioned range (less than 9.0 or more than 18.0), balance between the hydrophilicity and hydrophobicity of the nonionic dispersant is lost to make it difficult for the nonionic dispersant to be present near the waxes. Accordingly, the approach between the waxes cannot be suppressed. Details about the HLB value are described later.

(Ink)

The ink of the present invention is an aqueous ink for ink jet containing a particle formed of a wax (wax particle), the wax particle is waxes dispersed with both the specific nonionic dispersant and the anionic dispersant. Respective components to be used in the ink and the like are described in detail later.

(Wax Particle)

The ink includes the wax particle obtained by dispersing the wax with both of the nonionic dispersant and the anionic dispersant. The wax particle is a particle formed from the wax. In other words, the ink includes the wax, the nonionic dispersant for dispersing the wax and the anionic dispersant for dispersing the wax. The term "wax" as used herein may refer to a composition blended with a component except the wax or may refer to the wax itself.

The wax is an ester of a higher monohydric or dihydric alcohol that is insoluble in water and a fatty acid in a narrow sense. Accordingly, animal-based waxes and plant-based waxes are included in the category of the wax but oils and fats are not included therein. High-melting point fats, mineral-based waxes, petroleum-based waxes and blends and modified products of various waxes are included therein in a broad sense. In the present invention of the recording method, the waxes in a broad sense may each be used without any particular limitation. The waxes in a broad sense may be classified into natural waxes, synthetic waxes, blends thereof (blended waxes) and modified products thereof (modified waxes).

Examples of the natural wax may include: animal-based waxes, such as beeswax, a spermaceti wax and lanolin; plant-based waxes, such as a Japan wax, a carnauba wax, a sugar cane wax, a palm wax, a candelilla wax and a rice wax; mineral-based waxes such as a montan wax; and petroleum-based waxes, such as a paraffin wax, a microcrystalline wax and petrolatum. Examples of the synthetic wax may include hydrocarbon-based waxes, such as a Fischer-Tropsch wax and polyolefin waxes (e.g., polyethylene wax and polypropylene wax). The blended waxes are mixtures of the above-mentioned various waxes. The modified waxes are obtained by subjecting the above-mentioned various waxes to modification treatment, such as oxidation, hydrogenation, alcohol modification, acrylic modification or urethane modification. For example, an oxidized polyolefin is a product obtained by subjecting a polyolefin to oxidation treatment. The oxidized polyolefin may be synthesized by oxidizing the polyolefin or a commercial product may be used. Examples of such oxidized polyolefin may include an oxidized polyethylene wax and an oxidized polypropylene wax, which are oxidized products of polyolefin waxes. The above-mentioned waxes may be used alone or in combination thereof. The wax is preferably at least one kind selected from the group consisting of: a microcrystalline wax; a Fischer-Tropsch wax; a poly olefin wax; a paraffin wax; and modified products and blends thereof. Of those, a blend of a plurality of kinds of waxes is more preferred and a blend of a petroleum-based wax and a synthetic wax is particularly preferred.

The wax is preferably a solid at room temperature (25° C.). The melting point (° C.) of the wax is preferably 40° C. or more to 120° C. or less, more preferably 50° C. or more to 100° C. or less. The melting point of the wax may be measured in conformity with a test method described in the section 5.3.1 (Melting Point Testing Method) of JIS K 2235:1991 (Petroleum Waxes). In the cases of a microcrystalline wax, petrolatum and a mixture of a plurality of kinds of waxes, their melting points may be measured with higher accuracy by utilizing a test method described in the section 5.3.2 thereof. The melting point of the wax is susceptible to characteristics, such as a molecular weight (a larger molecular weight provides a higher melting point), a molecular structure (a linear structure provides a higher melting point but a branched structure provides a lower melting point), crystallinity (higher crystallinity provides a higher melting point) and a density (a higher density provides a higher melting point). Accordingly, the control of those characteristics can provide a wax having a desired melting point. The melting point of the wax in the ink may be measured, for example, as follows: after the wax fractionated by subjecting the ink to ultracentrifugation treatment has been washed and dried, its melting point is measured in conformity with each of the above-mentioned test methods.

The content (% by mass) of the wax in the ink is preferably 0.30% by mass or more to 8.00% by mass or less, more preferably 0.50% by mass or more to 4.00% by mass or less with respect to the total mass of the ink. The total content (% by mass) of the wax and the dispersant for dispersing the wax in the ink is preferably 0.50% by mass or more to 10.00% by mass or less, preferably 0.50% by mass or more to 9.00% by mass or less, more preferably 1.00% by mass or more to 5.00% by mass or less with respect to the total mass of the ink. The dispersant for dispersing a wax contains (i) a nonionic dispersant and (ii) an anionic dispersant described later.

(Dispersant for Wax)
[Nonionic Dispersant]

A compound represented by the following general formula (1) is used as the nonionic dispersant for dispersing the wax. This compound is sometimes referred to as "polyoxyalkylene alkyl ether" or "polyoxyalkylene alkenyl ether." An alkyl ether and an alkenyl ether are hereinafter collectively described as "alkyl ether" for convenience. In addition, the HLB value of the nonionic dispersant is 9.0 or more to 18.0 or less.

$$R^1\text{—O—}(R^2O)_n\text{—H}$$

In the general formula (1), $R^1$ represents an alkyl group or an alkenyl group and the number of carbon atoms thereof is 4 or more to 40 or less, $R^2$s each independently represent an ethylene group, a propylene group or a butylene group and "n" represents the number of moles added of an alkylene oxide and represents 3 or more to 50 or less.

$R^1$ represents an alkyl group or an alkenyl group and the number of carbon atoms thereof is 4 or more to 40 or less. $R^2$s each independently represent an ethylene group, a propylene group or a butylene group. Of those, an ethylene group or a propylene group is preferred. "n" represents the number of moles added of an alkylene oxide and represents 3 or more to 50 or less.

The "HLB value" of a surfactant as used herein is a value determined by Griffin's method and is calculated based on the equation "HLB value=20×(formula weight of hydrophilic group of surfactant)/(molecular weight of surfactant)." The HLB value determined by Griffin's method is a physical property value representing the degree of the hydrophilicity or lipophilicity of the surfactant and has a value of from 0 to 20. As the HLB value becomes smaller, the lipophilicity becomes higher and as the HLB value becomes larger, the hydrophilicity becomes higher.

Examples of the polyoxyalkylene alkyl ether may include: a polyoxyethylene alkyl ether (the general formula (2): $R^1\text{—O—}(C_2H_4O)_n\text{—H}$); a polyoxypropylene alkyl ether (the general formula (3): $R^1\text{—O—}(C_3H_6O)_n\text{—H}$); a polyoxyethylene-polyoxypropylene alkyl ether (the general formula (4): $R^1\text{—O—}[(C_2H_4O)_{n1}\text{—}(C_3H_6O)_{n2}]\text{—H}$); and a polyoxybutylene alkyl ether (the general formula (5): $R^1\text{—O—}(C_4H_8O)_n\text{—H}$). Of those, a polyoxyethylene alkyl ether and a polyoxypropylene alkyl ether are preferred. Those nonionic dispersants may be used alone or in combination thereof. As described above, $R^1$ in each of the general formulae (2) to (5) represents an alkyl group or an alkenyl group and "n" (including n1 and n2, which are independent of each other) represents the number of moles added (number of repeating units) of an alkylene oxide (ethylene oxide, propylene oxide or butylene oxide).

Examples of the polyoxyethylene alkyl ether may include polyoxyethylene lauryl ether, polyoxyethylene tridecyl ether, polyoxyethylene myristyl ether, polyoxyethylene cetyl ether, polyoxyethylene oleyl ether, polyoxyethylene stearyl ether, polyoxyethylene isosteraryl ether, polyoxyethylene behenyl ether and polyoxyethylene octyldodecyl ether.

Examples of the polyoxypropylene alkyl ether may include polyoxypropylene butyl ether, polyoxypropylene myristyl ether, polyoxypropylene cetyl ether and polyoxypropylene stearyl ether.

Examples of the polyoxyethylene-polyoxypropylene alkyl ether may include polyoxyethylene-polyoxypropylene butyl ether, polyoxyethylene-polyoxypropylene lauryl ether, polyoxyethylene-polyoxypropylene cetyl ether and polyoxyethylene-polyoxypropylene stearyl ether.

Of the polyoxyalkylene alkyl ethers, a polyoxyethylene alkyl ether is preferred. That is, the nonionic dispersant is preferably a compound represented by the following general formula (2).

$$R^1\text{—O—}(C_2H_4O)_n\text{—H} \qquad (2)$$

In the general formula (2), $R^1$ represents an alkyl group or an alkenyl group and the number of carbon atoms thereof is 4 or more to 40 or less and "n" represents the number of moles added of an alkylene oxide and represents 3 or more to 50 or less.

When the polyoxyethylene alkyl ether and the anionic dispersant are used in combination for dispersing the wax, the uneven distribution of the wax in the recorded surface of a recording medium is easily suppressed and hence the wax are caused to be present on the recording medium more uniformly. Thus, a change in glossy feeling of the recorded surface can be efficiently suppressed.

In addition, the number of moles added of the alkylene oxide in the polyoxyalkylene alkyl ether is more preferably 10 or more because the change in glossy feeling is efficiently suppressed. The alkylene oxide may be referred to as, for example, "alkylene oxide group," "oxyalkylene group," "polyoxyalkylene chain" or "polyalkylene oxide chain." The number of moles added of the alkylene oxide is the number of repeating units of ethylene oxide, propylene oxide, butylene oxide or a total thereof. The number of moles added of the alkylene oxide is preferably 40 or less.

Further, the hydrocarbon group represented by $R^1$ in each of the general formulae (2) to (4) may be any one of linear and branched groups and may be any one of saturated and unsaturated groups. The number of the carbon atoms of the hydrocarbon group represented by $R^1$ is more preferably 5 or more to 30 or less. When the number of the carbon atoms of the hydrocarbon group is 5 or more to 30 or less, an interaction between the wax particles resulting from the anionic dispersant to be used in combination with the polyoxyalkylene alkyl ether is inhibited and hence the uneven distribution of the wax in the recorded surface is easily suppressed. Accordingly, a change in glossy feeling of an image is efficiently suppressed with ease. The number of the carbon atoms of the hydrocarbon group represented by $R^1$ is particularly preferably 8 or more to 30 or less.

The nonionic dispersant is preferably a nonionic surfactant. The surfactant is a substance composed of a hydrophobic part (hydrocarbon chains, perfluoroalkyl groups, siloxane structures, etc.) and a hydrophilic part (such as an ethylene oxide group). In other words, the nonionic dispersant preferably does not contain a water-soluble organic solvent (for example, triethylene glycol monobutyl ether ($R^1$:4, n:3), tetraethylene glycol monobutyl ether ($R^1$:4, n:3), etc.) even if the compound represented by general formula (1) is used.

The molecular weight of the nonionic surfactant is preferably 280 or more, and more preferably 300 or more. The molecular weight is preferably 3,000 or less, more preferably 2,500 or less, and particularly preferably 2,000 or less.

The content (% by mass) of the nonionic dispersant in the ink is preferably 0.01% by mass or more to 2.50% by mass or less, more preferably 0.10% by mass or more to 2.50% by mass or less with respect to the total mass of the ink. In particular, the content is still more preferably 0.30% by mass or more to 1.50% by mass or less.

[Anionic Dispersant]

A compound having at least one kind of anionic group selected from the group consisting of: a sulfonic acid group; a carboxylic acid group; and a phosphoric acid group is used as the anionic dispersant for dispersing the wax. In particular, the anionic group in the anionic dispersant is preferably a carboxylic acid group.

The inventors of the present invention have assumed the reason why the anionic group in the anionic dispersant is preferably a carboxylic acid group to be as described below. The anionic dispersant having a carboxylic acid group can form a hydrogen bond with the nonionic dispersant to be used in combination therewith directly or through water in the ink. As a result, the position at which the wax dispersed with the above-mentioned dispersants is fixed can be made more random and hence the wax hardly has a sea-island structure. Probably as a result of the foregoing, the change in glossy feeling of the image can be effectively suppressed.

An anionic surfactant, a resin having an anionic functional group or the like may be suitably used as the above-mentioned anionic dispersant having an anionic group. Specifically, for example, a carboxylic acid salt, a sulfonic acid salt, a sulfuric acid ester salt or a phosphoric acid ester salt may be used as the anionic surfactant. Examples of the anionic dispersant include a straight-chain higher carboxylic acid (salt), a sulfonic acid (salt), an alkylbenzene sulfonic acid salt, an alkyl sulfuric acid ester salt, a polyoxyethylene alkyl sulfuric acid ester salt, an alkyl phosphoric acid ester salt and a resin having an anionic functional group. More specifically, examples of the anionic dispersant include montanic acid, isomerized linoleic acid and salts thereof.

In addition, for example, an ethylene-acrylic acid copolymer may be suitably used as the resin having an anionic functional group. The anionic dispersant having an anionic group is preferably a resin having an anionic group, more preferably an ethylene-acrylic acid copolymer. The use of the ethylene-acrylic acid copolymer improves the dispersibility of the wax and at the same time, improves an effect exhibited by combined use of the anionic dispersant and the nonionic dispersant. Accordingly, the uneven distribution of the wax in the recorded surface is suppressed and hence the change in glossy feeling can be suppressed at a higher level.

The content (% by mass) of the anionic dispersant in the ink is preferably 0.01% by mass or more to 2.50% by mass or less, more preferably 0.02% by mass or more to 2.00% by mass or less with respect to the total mass of the ink. In particular, the content is particularly preferably 0.04% by mass or more to 1.50% by mass or less.

The mass ratio of the total content (% by mass) of the nonionic dispersant and the anionic dispersant in the ink to the content (% by mass) of the wax therein is preferably 0.15 times or more to 0.50 times or less. When the mass ratio is set to 0.15 times or more, the dispersion stability of the wax is sufficiently obtained and hence the change in glossy feeling of the image can be suppressed at a higher level. Meanwhile, when the mass ratio is set to 0.50 times or less, the dispersion stability of the wax can be maintained while the sinking of the wax into the recording medium is suppressed. Accordingly, the abrasion resistance of the image can be further improved.

The mass ratio of the content (% by mass) of the anionic dispersant in the ink to the content (% by mass) of the nonionic dispersant therein is preferably 0.10 times or more to 0.50 times or less. When the above-mentioned mass ratio is set within the above-mentioned range, while the wax is stably dispersed, an interaction between the wax particles resulting from the anionic dispersant to be used in combination with the nonionic dispersant is inhibited and hence the uneven distribution of the wax in the surface of the recording medium is easily suppressed. Accordingly, the change in glossy feeling of the image can be suppressed at a higher level.

[Coloring Material]

The ink preferably includes the coloring material. A pigment or a dye may be used as the coloring material. The content (% by mass) of the coloring material in the ink is preferably 0.5% by mass or more to 15.0% by mass or less, more preferably 1.0% by mass or more to 10.0% by mass or less with respect to the total mass of the ink.

Specific examples of the pigment may include: inorganic pigments, such as carbon black and titanium oxide; and organic pigments, such as azo, phthalocyanine, quinacridone, isoindolinone, imidazolone, diketopyrrolopyrrole and dioxazine pigments. The pigments may be used alone or in combination thereof.

A resin-dispersed pigment using a resin as a dispersant, a self-dispersible pigment, which has a hydrophilic group bonded to its particle surface, or the like may be used as a dispersion system for the pigment. In addition, a resin-bonded pigment having a resin-containing organic group chemically bonded to its particle surface, a microcapsule pigment, which contains a particle whose surface is covered with, for example, a resin, or the like may be used. Pigments different from each other in dispersion system out of those pigments may be used in combination. In the present invention, not a resin-bonded pigment or a microcapsule pigment but a resin-dispersed pigment having resin as dispersant to physically adsorb to its particle surface of pigment or a self-dispersible pigment having a hydrophilic group bonded to its particle surface is preferably used.

A dispersant that can disperse the pigment in an aqueous medium through the action of an anionic group is preferably used as a resin dispersant for dispersing the pigment in the aqueous medium. A resin having an anionic group may be used as the resin dispersant and such a resin as described later, in particular, a water-soluble resin is preferably used. The mass ratio of the content (% by mass) of the pigment in the ink to the content (% by mass) of the resin dispersant therein is preferably 0.3 times or more to 10.0 times or less.

A pigment having an anionic group bonded to its particle surface directly or through any other atomic group (—R—) may be used as the self-dispersible pigment Specific examples of the other atomic group (—R—) may include: a linear or branched alkylene group having 1 to 12 carbon atoms; an arylene group, such as a phenylene group or a naphthylene group; a carbonyl group; an imino group; an amide group; a sulfonyl group; an ester group; and an ether group. In addition, groups obtained by combining those groups may be adopted.

A dye having an anionic group is preferably used as the dye. Specific examples of the dye may include dyes, such as azo, triphenylmethane, (aza)phthalocyanine, xanthene and anthrapyridone dyes. The dyes may be used alone or in combination thereof. The coloring material is preferably a pigment, more preferably a resin-dispersed pigment or a self-dispersible pigment.

The anionic groups mentioned above in the description of a resin dispersant, a self-dispersible pigment, and a dye include, for example, a carboxylic acid group, a sulfonic acid group, and a phosphonic acid group. The anionic group may be any one of an acid type or a salt type. When the group is a salt type, the group may be in any one of a state in which part of the group dissociates or a state in which the entirety thereof dissociates. When the anionic group is a salt type, examples of a cation serving as a counterion may include an alkali metal cation, ammonium and an organic ammonium. The color material contained in the ink is preferably a pigment, and more preferably a resin-dispersed pigment or a self-dispersible pigment. In particular, the ink preferably contains a resin-dispersed pigment.

[Resin]

A resin may be incorporated into the ink. The content (% by mass) of the resin in the ink is preferably 0.1% by mass or more to 20.0% by mass or less, more preferably 0.5% by mass or more to 15.0% by mass or less with respect to the total mass of the ink.

The resin may be added to the ink for (i) stabilizing the dispersed state of the pigment, that is, as a resin dispersant or an aid therefor. In addition, the resin may be added to the ink for (ii) improving the various characteristics of an image to be recorded. Examples of the form of the resin may include a block copolymer, a random copolymer, a graft copolymer and a combination thereof. In addition, the resin may be a water-soluble resin that can be dissolved in an aqueous medium or may be a resin particle to be dispersed in the aqueous medium. The resins may be used alone or in combination thereof

[Composition of Resin]

Examples of the resin may include an acrylic resin, a urethane-based resin and an olefin-based resin. Of those, an acrylic resin and a urethane-based resin are preferred and an acrylic resin including a unit derived from (meth)acrylic acid or a (meth)acrylate is more preferred.

A resin having a hydrophilic unit and a hydrophobic unit as its structural units is preferred as the acrylic resin. Of those, a resin having a hydrophilic unit derived from (meth) acrylic acid and a hydrophobic unit derived from at least one selected from a group consisting of a monomer having an aromatic ring and a (meth)acrylic acid ester-based monomer is preferred. A resin having a hydrophilic unit derived from (meth)acrylic acid and a hydrophobic unit derived from at least one monomer selected from a group consisting of styrene and α-methylstyrene is particularly preferred. Those resins may each be suitably utilized as a resin dispersant for dispersing the pigment because the resins each easily cause an interaction with the pigment.

The hydrophilic unit is a unit having a hydrophilic group such as an anionic group. The hydrophilic unit may be formed by, for example, polymerizing a hydrophilic monomer having a hydrophilic group. Specific examples of the hydrophilic monomer having a hydrophilic group may include: acidic monomers each having a carboxylic acid group, such as (meth)acrylic acid, itaconic acid, maleic acid and fumaric acid; and anionic monomers, such as anhydrides and salts of these acidic monomers. A cation for forming the salt of the acidic monomer may be, for example, a lithium, sodium, potassium, ammonium or organic ammonium ion. The hydrophobic unit is a unit free of a hydrophilic group such as an anionic group. The hydrophobic unit may be formed by, for example, polymerizing the hydrophobic monomer free of a hydrophilic group such as anionic group. Specific examples of the hydrophobic monomer may include: monomers each having an aromatic ring, such as styrene, α-methylstyrene and benzyl (meth)acrylate; and (meth)acrylic acid ester-based monomers, such as methyl (meth)acrylate, butyl (meth)acrylate and 2-ethylhexyl (meth)acrylate.

The urethane-based resin may be obtained by, for example, causing a polyisocyanate and a polyol to react with each other. In addition, a chain extender may be further caused to react with the reaction product. Examples of the olefin-based resin may include polyethylene and polypropylene.

[Properties of Resin]

The phrase "resin is water-soluble" as used herein means that when the resin is neutralized with an alkali whose amount is equivalent to its acid value, the resin is present in an aqueous medium under a state in which the resin does not form any particle whose particle diameter may be measured by a dynamic light scattering method. Whether or not the resin is water-soluble can be judged in accordance with the following method. First, a liquid (resin solid content: 10% by mass) containing the resin neutralized with an alkali (e.g., sodium hydroxide or potassium hydroxide) corresponding to its acid value is prepared. Next, the prepared liquid is diluted with pure water tenfold (on a volume basis) to prepare a sample solution. Then, when no particle having a particle diameter is measured at the time of the measurement of the particle diameter of the resin in the sample solution by the dynamic light scattering method, the resin can be judged to be water-soluble. Measurement conditions at this time may be set, for example, as follows: SetZero: 30 seconds; number of times of measurement: 3; and measurement time: 180 seconds. In addition, a particle size analyzer based on the dynamic light scattering method (e.g., an analyzer available under the product name "UPA-EX150" from Nikkiso Co., Ltd.) or the like may be used as a particle size distribution measuring device. Of course, the particle size distribution measuring device to be used, the measurement conditions and the like are not limited to the foregoing.

The acid value of the water-soluble resin is preferably 100 mgKOH/g or more to 250 mgKOH/g or less. The weight-average molecular weight of the water-soluble resin is preferably 3,000 or more to 15,000 or less.

The acid value of a resin for forming the resin particle is preferably 5 mgKOH/g or more to 100 mgKOH/g or less. The weight-average molecular weight of the resin for forming the resin particle is preferably 1,000 or more to 3,000, 000 or less, more preferably 100,000 or more to 3,000,000 or less. The volume-based 50% cumulative particle diameter ($D_{50}$) of the resin particle measured by a dynamic light scattering method is preferably 50 nm or more to 500 nm or less. The volume-based 50% cumulative particle diameter of the resin particle is the diameter of the particle in a particle diameter cumulative curve at which the ratio of the particle integrated from small particle diameters reaches 50% with respect to the total volume of the measured particle. The volume-based 50% cumulative particle diameter of the resin particle may be measured with the above-mentioned particle size analyzer of a dynamic light scattering system and under the above-mentioned measurement conditions. The glass transition temperature of the resin particle is preferably 40° C. or more to 120° C. or less, more preferably 50° C. or more to 100° C. or less. The glass transition temperature (° C.) of the resin particle may be measured with a differential scanning calorimeter (DSC). The resin particle does not need to include any coloring material.

[Aqueous Medium]

The ink is an aqueous ink including at least water as an aqueous medium. An aqueous medium that is the water or a mixed solvent of the water and a water-soluble organic solvent may be incorporated into the ink. Deionized water or ion-exchanged water is preferably used as the water. The content (% by mass) of the water in the aqueous ink is preferably 50.0% by mass or more to 95.0% by mass or less with respect to the total mass of the ink. In addition, the content (% by mass) of the water-soluble organic solvent in the aqueous ink is preferably 2.0% by mass or more to 45.0% by mass or less with respect to the total mass of the ink. Solvents that may be used in an ink for inkjet, such as alcohols, (poly)alkylene glycols, glycol ethers, nitrogen-containing compounds and sulfur-containing compounds, may each be used as the water-soluble organic solvent. The water-soluble organic solvents may be used alone or in combination thereof. The water-soluble organic solvents shall not include "surfactants."

[Water-Soluble Hydrocarbon Compound]

The water-soluble organic solvent to be incorporated into the ink preferably contains a specific water-soluble hydrocarbon compound. The water-soluble hydrocarbon compound is a compound having a hydrocarbon chain having 3 or more carbon atoms, the compound being substituted with 2 or more hydrophilic groups each selected from the group consisting of: a hydroxy group; an amino group; and an anionic group. However, the hydrocarbon chain may be interrupted by a sulfonyl group or an ether group. When the number of the carbon atoms of the hydrocarbon chain is 3 or 4, the hydrophilic groups include an anionic group or the hydrocarbon chain is interrupted by a sulfonyl group.

In the present invention, a hydrocarbon compound in the state of being dissolved in water at a content of the compound in the ink at 25° C. is defined as being "water-soluble". That is, the solubility of the compound in water at 25° C. is larger than the content thereof in the ink. The fact that the hydrocarbon chain is interrupted by a sulfonyl group or an ether group means that a sulfonyl group (—S(=O)$_2$—) or an ether group (—O—) is present in the middle of the hydrocarbon chain. The water-soluble hydrocarbon compound has hydrogen-bonding groups, such as a hydroxy group, an amino group, an anionic group, a sulfonyl group and an ether group. Accordingly, the use of the ink including the hydrocarbon compound can suppress the cockling or curl of a recording medium having recorded thereon an image. A general hydrocarbon compound having a hydrocarbon chain having a relatively small number of carbon atoms (3 or 4 carbon atoms) tends to have a small molecular weight and hence have a low vapor pressure. However, the above-mentioned water-soluble hydrocarbon compound has a hydrogen-bonding anionic group or its hydrocarbon chain is interrupted by a sulfonyl group. Accordingly, the compound hardly evaporates owing to an intermolecular or intramolecular interaction and hence remains between fibers for constituting the recording medium to exhibit a suppressing action on the cockling or the curl. The content (% by mass) of the water-soluble hydrocarbon compound in the ink is preferably 1.0% by mass or more to 20.0% by mass or less with respect to the total mass of the ink.

The number of the carbon atoms of the hydrocarbon chain for forming the water-soluble hydrocarbon compound is preferably 3 or more to 50 or less, more preferably 3 or more to 10 or less. Examples of the anionic group may include a sulfonic acid group and a carboxylic acid group. Specific examples of the water-soluble hydrocarbon compound may include: alkanediols, such as 1,5-pentanediol and 1,6-hexanediol; amino acids, such as alanine, β-alanine, trimethylglycine, amidosulfuric acid (alias:sulfamic acid), aminomethanesulfonic acid, taurine (alias: 2-aminoethanesulfonic acid), carbamic acid, glycine, aspartic acid, glutamic acid, sulfanilic acid or salts of any of the acids described above, phenylalanine, leucine, isoleucine, threonine, tryptophan, valine, methionine, lysine and arginine; sulfonyl compounds such as bis(2-hydroxyethyl) sulfone; alkylene glycols, such as triethylene glycol, tetraethylene glycol, tripropylene glycol and a polyethylene glycol having a number-average molecular weight of from about 200 to about 1,000; and sugars, such as sorbitol, D-sorbitol, xylitol, trehalose, fructose and D(+)-xylose. The water-soluble hydrocarbon compounds may be used alone or in combination thereof.

[Other Component]

The ink may include various additives, such as an antifoaming agent, a surfactant, a pH adjustor, a viscosity modifier, a rust inhibitor, an antiseptic, a fungicide, an antioxidant and an anti-reducing agent, as required in addition to the above-mentioned components. However, the ink is preferably free of the reactant to be used in the reaction liquid as described later.

[Physical Properties of Ink]

The ink is an aqueous ink to be applied to an ink jet system. Accordingly, from the viewpoint of reliability, it is preferred that the physical property values of the ink be appropriately controlled. Specifically, the static surface tension of the ink at 25° C. is preferably 20 mN/m or more to 60 mN/m or less. From the viewpoint of causing the wax to be uniformly present on the recording medium at the time of the fixation of the ink to suppress the change in glossy feeling at a high level, the static surface tension of the ink at 25° C. is more preferably 35 mN/m or less, particularly preferably 25 mN/m or more to 35 mN/m or less. In addition, the viscosity of the ink at 25° C. is preferably 1.0 mPa·s or more to 10.0 mPa·s or less. The pH of the ink at 25° C. is preferably 7.0 or more to 9.5 or less, more preferably 8.0 or more to 9.5 or less.

(Reaction Liquid)

The recording method of the present invention preferably further includes, before an ink applying step, a reaction liquid applying step of applying an aqueous reaction liquid, which contains a reactant that reacts with the aqueous ink, to the recording medium. Respective components to be used in the reaction liquid and the like are described in detail below.

[Reactant]

The reaction liquid is brought into contact with the ink to react with the ink, to thereby aggregate components (a component having an anionic group such as a resin, a dispersant for dispersing wax, and a self-dispersible pigment) in the ink. The reaction liquid contains the reactant. When the reactant is present, at the time of contact between the ink and the reactant in the recording medium, the state of presence of the component having an anionic group in the ink is destabilized and hence the aggregation of the ink can be accelerated. Examples of the reactant may include: a polyvalent metal ion; a cationic component such as a cationic resin; and an organic acid. The reactants may be used alone or in combination thereof.

Examples of the polyvalent metal ion forming a polyvalent metal salt may include: divalent metal ions, such as $Ca^{2+}$, $Cu^{2+}$, $Ni^{2+}$, $Mg^{2+}$, $Sr^{2+}$, $Ba^{2+}$ and $Zn^{2+}$; and trivalent metal ions, such as $Fe^{3+}$, $Cr^{3+}$, $Y^{3+}$ and $Al^{3+}$. A water-soluble polyvalent metal salt (which may be a hydrate) made up of the polyvalent metal ion and an anion bonded to each other may be used to incorporate the polyvalent metal ion into the reaction liquid. Examples of such anion may include: inorganic anions, such as $Cl^-$, $Br^-$, $I^-$, $ClO^-$, $ClO^{2+}$, $ClO_3^-$, $ClO_4^-$, $NO_2^-$, $NO_3^-$, $SO_4^{2-}$, $CO_3^{2-}$, $HCO_3^-$, $PO_4^{3-}$, $HPO_4^{2-}$ and $H_2PO_4^-$; and organic anions, such as $HCOO^-$, $(COO^-)_2$, $COOH(COO^-)$, $CH_3COO^-$, $CH_3CH(OH)COO^-$, $C_2H_4(COO^-)_2$, $C_6H_5COO^-$, $C_6H_4(COO^-)_2$ and $CH_3SO_3^-$. When the polyvalent metal ion is used as the reactant, its content (% by mass) in terms of polyvalent metal salt in the reaction liquid is preferably 1.0% by mass or more to 20.0% by mass or less with respect to the total mass of the reaction liquid. In this specification, when the polyvalent metal salt is a hydrate, the "content (% by mass) of the polyvalent metal salt" in the reaction liquid means the "content (% by mass) of the anhydride of the polyvalent metal salt" obtained by removing water serving as a hydrate.

The reaction liquid containing the organic acid has a buffering capacity in an acidic region (at a pH of less than 7.0, preferably at a pH of from 2.0 to 5.0) to efficiently turn the anionic group of the components present in the ink into an acid type, to thereby aggregate the ink. Examples of the organic acid may include: monocarboxylic acids, such as formic acid, acetic acid, propionic acid, butyric acid, benzoic acid, glycolic acid, lactic acid, salicylic acid, pyrrolecarboxylic acid, furancarboxylic acid, picolinic acid, nicotinic acid, thiophenecarboxylic acid, levulinic acid and coumalic acid, and salts thereof; dicarboxylic acids, such as oxalic acid, malonic acid, succinic acid, glutaric acid, adipic acid, maleic acid, fumaric acid, itaconic acid, sebacic acid, phthalic acid, malic acid and tartaric acid, and salts and hydrogen salts thereof; tricarboxylic acids, such as citric acid and trimellitic acid, and salts and hydrogen salts thereof; and tetracarboxylic acids such as pyromellitic acid, and salts and hydrogen salts thereof. When the organic acid is used as the reactant, the content (% by mass) of the organic acid in the reaction liquid is preferably 1.0% by mass or more to 50.0% by mass or less with respect to the total mass of the reaction liquid.

Examples of the cationic resin may include resins having structures of primary to tertiary amines and resins having structures of quaternary ammonium salts. Specific examples thereof may include resins having structures of, for example, vinylamine, allylamine, vinylimidazole, vinylpyridine, dimethylaminoethyl methacrylate, ethylene imine, guanidine, diallyldimethylammonium chloride and an alkylamine-epichlorohydrin condensate. To improve solubility in the reaction liquid, the cationic resin and an acidic compound may be used in combination or the cationic resin may be subjected to quaternization treatment. When the cationic resin is used as the reactant, the content (% by mass) of the cationic resin in the reaction liquid is preferably 0.1% by mass or more to 10.0% by mass or less with respect to the total mass of the reaction liquid.

[Aqueous Medium]

The reaction liquid is an aqueous reaction liquid containing at least water as an aqueous medium. Examples of the aqueous medium to be used in the reaction liquid may include the same examples as those of an aqueous medium that can be incorporated into the ink described above. The content (% by mass) of the water-soluble organic solvent in the reaction liquid is preferably 1.0% by mass or more to 45.0% by mass or less with respect to the total mass of the reaction liquid. The water-soluble organic solvent preferably contains a specific water-soluble hydrocarbon compound described above. The content (% by mass) of the water-soluble hydrocarbon compound in the reaction liquid is preferably 1.0% by mass or more to 20.0% by mass or less with respect to the total mass of the reaction liquid. In addition, the content (% by mass) of the water in the reaction liquid is preferably 50.0% by mass or more to 95.0% by mass or less with respect to the total mass of the reaction liquid.

[Other Component]

The reaction liquid may contain various other components as required. Examples of the other components may include the same examples as those of other components that can be incorporated into the ink to be described above. However, the reaction liquid preferably does not contain a wax.

[Physical Properties of Reaction Liquid]

The reaction liquid is an aqueous reaction liquid to be applied to an ink jet system. Accordingly, from the viewpoint of reliability, it is preferred that the physical property values of the reaction liquid be appropriately controlled. Specifically, the surface tension of the reaction liquid at 25° C. is preferably 20 mN/m or more to 60 mN/m or less. In addition, the viscosity of the reaction liquid at 25° C. is preferably 1.0 mPa·s or more to 10.0 mPa·s or less. The pH of the reaction liquid at 25° C. is preferably 5.0 or more to 9.5 or less, more preferably 6.0 or more to 9.0 or less.

<Ink Jet Recording Method and Ink Jet Recording Apparatus>

The ink jet recording method according to one embodiment of the present invention and an ink jet recording apparatus that may be suitably used in the ink jet recording method are described below with reference to the drawings. The ink jet recording method of this embodiment is a method including ejecting the above-mentioned ink from a recording head of an ink jet system to record an image on a recording medium. The inkjet recording apparatus of the present embodiment is provided with the above-mentioned ink and an inkjet recording head for ejecting the ink.

Figure 1:
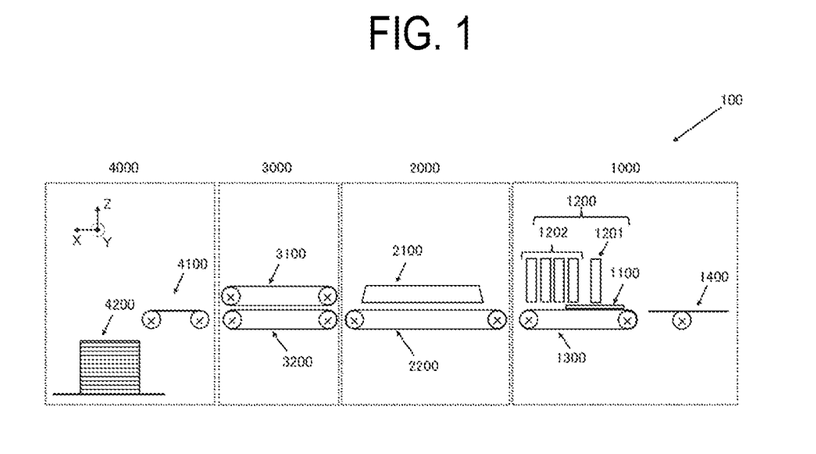
FIG. 1 is a schematic view for illustrating an ink jet recording apparatus according to one embodiment of the present invention.

FIG. 1 is a schematic view for illustrating an example of the schematic configuration of an ink jet recording apparatus 100 of this embodiment. The ink jet recording apparatus 100 is an ink jet recording apparatus that records an image on a recording medium with a reaction liquid containing a reactant that reacts with an ink and the ink. Herein, description is given by taking a case in which the reaction liquid is used together with the ink as an example. However, the reaction liquid may not be used. An X-direction, a Y-direction and a Z-direction represent the width direction (total length direction), depth direction and height direction of the ink jet recording apparatus, respectively. The recording medium is conveyed in the X-direction.

The ink jet recording apparatus 100 of the embodiment illustrated in FIG. 1 includes: a recording portion 1000; a heating portion 2000; a fixing portion 3000; and a sheet delivery portion 4000. In the recording portion 1000, various liquids are applied to a recording medium 1100, which has been conveyed from a sheet feeding device 1400 by a conveying member 1300, by a liquid applying device 1200. In the heating portion 2000, the liquid components of an image formed by the liquids applied to the recording medium 1100 are evaporated and dried by heating with a heating device 2100. In the fixing portion 3000, a fixing member 3100 is brought into contact with the region of the recording medium 1100 including the image to heat the image, to thereby accelerate the fixation of the image to the recording medium 1100. After that, the recording medium 1100 is conveyed by the conveying member 4100 of the sheet delivery portion 4000 and is loaded and stored in a recording medium storage portion 4200. Herein, description is given by taking a configuration including the heating portion 2000 and the fixing portion 3000 as an example. However, the heating portion or the fixing portion may be omitted in accordance with recording conditions (e.g., the kinds of the ink and the recording medium and a recording speed). In Examples to be described later, recording was performed without use of the heating portion 2000 and the fixing portion 3000.

Any medium may be used as the recording medium 1100. For example, such recording media each having ink absorbability (permeability) as described below may each be used as the recording medium 1100: a recording medium free of a coating layer, such as plain paper, uncoated paper or synthetic paper; and a recording medium including a coating layer, such as glossy paper or art paper. In addition, a recording medium that does not have permeability like a film or a sheet formed from a resin material, such as polyvinyl chloride (PVC) or polyethylene terephthalate (PET), may be used. The basis weight (g/m$^2$) of the recording medium 1100 is preferably 30 g/m$^2$ or more to 500 g/m$^2$ or less, more preferably 50 g/m$^2$ or more to 450 g/m$^2$ or less.

[Recording Portion]

The recording portion 1000 includes the liquid applying device 1200. The liquid applying device 1200 includes a reaction liquid applying device 1201 and an ink applying device 1202. The reaction liquid applying device 1201 illustrated in FIG. 1 is an example of a unit using an ejection head of an ink jet system. The reaction liquid applying device may be formed by utilizing a gravure coater, an offset coater, a die coater, a blade coater or the like in addition to the ejection head. The reaction liquid may be applied by the reaction liquid applying device 1201 before the application of the ink or may be applied after the ink application as long as the liquid can be brought into contact with the ink on the recording medium 1100. However, to record a high-quality image on various recording media having different liquid-absorbing characteristics, the reaction liquid is preferably applied before the application of the ink. An ejection head (recording head) of an inkjet system is used as the ink applying device 1202. Examples of the ejection system of the ejection head serving as the liquid applying device 1200 include: a system including causing film boiling in a liquid with an electro-thermal converter to form air bubbles, to thereby eject the liquid; and a system including ejecting the liquid with an electro-mechanical converter. Of those, a recording head configured to eject the aqueous ink through the action of thermal energy is preferably used. Such recording head is also called a so-called thermal head. In the thermal head, the use of the aqueous ink including the wax and the resin particle is liable to cause a problem in terms of ejection stability. However, the thermal head is preferred because the adoption of the configuration of the invention of the present application can suppress the occurrence of the above-mentioned problem.

The liquid applying device 1200 is a line head arranged in the Y-direction in an extended manner and its ejection orifices are arrayed in a range covering the image recording region of the recording medium having the maximum usable width. The ejection head has an ejection orifice surface (not shown) having formed therein ejection orifices on its lower side (recording medium 1100 side). The ejection orifice surface faces the recording medium 1100 with a minute distance of about several millimeters therebetween.

The plurality of ink applying devices 1202 may be arranged for applying inks of respective colors to the recording medium 1100. For example, when respective color images are recorded with a yellow ink, a magenta ink, a cyan ink and a black ink, the four ink applying devices 1202 that eject the above-mentioned four kinds of inks are arranged side by side in the X-direction. The ink and the reaction liquid are hereinafter sometimes collectively referred to as "liquids".

Figure 2:
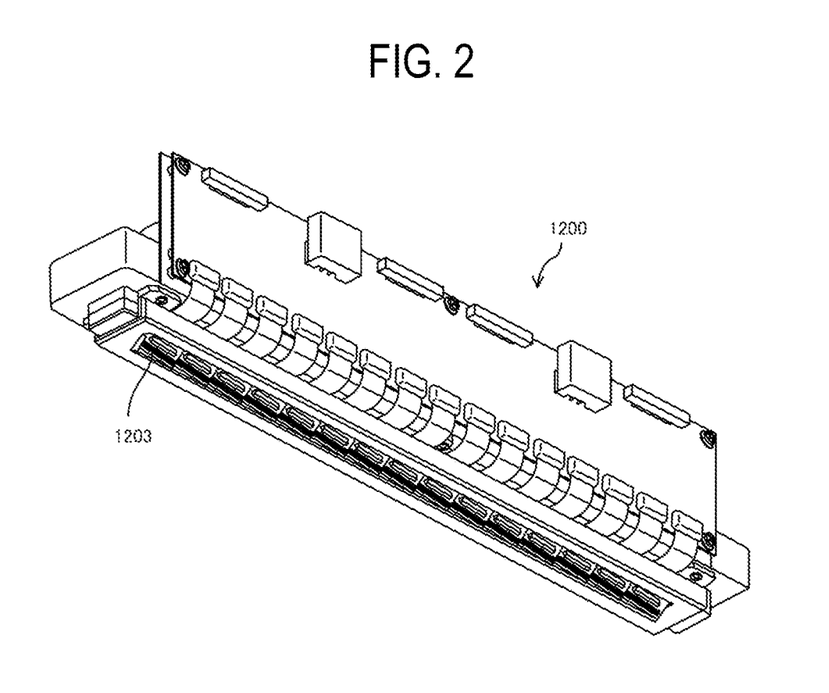
FIG. 2 is a perspective view for illustrating an example of a liquid applying device.

FIG. 2 is a perspective view for illustrating an example of the liquid applying device. The liquid applying device 1200 illustrated in FIG. 2 is a line head and a plurality of ejection element substrates 1203 having arranged therein ejection orifice arrays are linearly arrayed. The ejection element substrates 1203 each have arrayed therein a plurality of ejection orifice arrays.

[Conveyance System]

As illustrated in FIG. 1, the recording portion 1000 includes the liquid applying device 1200 and the conveying member 1300 that conveys the recording medium 1100. The reaction liquid and the ink are applied to the desired positions of the recording medium 1100, which is conveyed by the conveying member 1300, by the liquid applying device 1200. The respective liquid applying devices receive the image signal of drawing data to apply the required reaction liquid and ink to the respective positions. Although the conveying member 1300 in the form of a conveying belt is illustrated in FIG. 1, for example, a spur or a conveying cylinder may be utilized as long as the spur or the cylinder has a function of conveying the recording medium 1100. A member that can fix the recording medium 1100 may be used as the conveying member 1300 for improving conveyance accuracy. Specific examples thereof may include: an approach including arranging holes in the conveying member 1300 and sucking the recording medium 1100 from its rear surface side to fix the medium; and an approach including forming the conveying member 1300 from an appropriate material and electrostatically adsorbing the recording medium 1100 to fix the medium.

[Heating Portion]

As illustrated in FIG. 1, the heating portion 2000 includes the heating device 2100 and a conveying member 2200. The recording medium 1100 having recorded thereon the image through the application of the reaction liquid and the ink is heated by the heating device 2100 while being conveyed by the conveying member 2200. Thus, the liquid components of the image are evaporated and dried. The recording method preferably further includes, between the ink applying step and the fixing step, a drying step of subjecting the recording medium having applied thereto the ink to non-contact heating to dry the ink. The presence of such drying step can effectively suppress the deformation (cockling or curl) of the recording medium 1100.

The heating device 2100 may have any configuration as long as the device can heat the recording medium 1100. Conventionally known various devices, such as a warm-air dryer and a heater, may each be used. Of those, a non-contact-type heater, such as a heating wire and an infrared heater, is preferably utilized in terms of safety and energy efficiency. In addition, the utilization of the following mechanism easily improves the drying efficiency: the mechanism has built therein a fan for jetting a heated gas on the recording medium 1100 and blows warm air thereto.

With regard to a method for the heating, the recording medium 1100 may be heated from the side of the surface having applied thereto the reaction liquid and the ink, may be heated from its rear surface side or may be heated from both the surfaces. A heating function may be imparted to the conveying member 2200. Although the conveying member 2200 in the form of a conveying belt is illustrated in FIG. 1, for example, a spur or a conveying cylinder may be utilized as long as the spur or the cylinder has a function of conveying the recording medium 1100.

[Fixing Portion]

As illustrated in FIG. 1, in the fixing portion 3000, the recording medium 1100 is conveyed by a conveying member 3200. In addition, the fixing member 3100 is brought into contact with the recording medium 1100 under a state in which the medium is pressurized to heat the liquids applied to the recording medium 1100, such as the reaction liquid and the ink. Thus, an image can be fixed to the recording medium 1100. After the permeation of the liquid components of the reaction liquid and the ink into the recording medium 1100 having recorded thereon the image and the evaporation thereof from the recording medium 1100 by their passing through the heating portion 2000, the reaction liquid and the ink are fixed in the fixing portion 3000 to complete the image. When the recording medium 1100 is heated and pressurized under the state of being sandwiched between the fixing member 3100 and the conveying member 3200, the image on the recording medium 1100 and the fixing member 3100 are brought into close contact with each other and hence the image is fixed to the recording medium. When a liquid such as an ink containing the resin particle and a coloring material is used, the resin particle is softened through heating mainly by the fixing portion 3000 to form a film and hence the coloring material can be bound onto the recording medium 1100.

A method of heating the fixing member 3100 may be, for example, a system including arranging a heat source such as a halogen heater in each of rollers that drive the fixing member 3100 serving as a fixing belt to heat the member. In addition, the method may be, for example, a system including arranging a heat source such as an infrared heater at a site different from the fixing member 3100 to heat the member. Further, those systems may be combined with each other.

[Sheet Delivery Portion]

The recording medium 1100 after the image recording is stored in the sheet delivery portion 4000 (FIG. 1). Specifically, the recording medium 1100 after the recording is conveyed by the conveying member 4100 to be finally stored under the state of being loaded in the recording medium storage portion 4200. The two or more recording medium storage portions 4200 may be arranged for, for example, separately storing different recorded matters.

Examples

The present invention is described in more detail below by way of Examples and Comparative Examples. The present invention is by no means limited to Examples below without departing from the gist of the present invention. "Part(s)" and "%" with regard to the description of the amounts of components are by mass, unless otherwise stated.

<Preparation of Reaction Liquids>

Respective components (unit: %) shown in Table 1 were mixed and sufficiently stirred, followed by filtration with a cellulose acetate filter having a pore size of 3.0 μm (manufactured by Advantec) under pressure. Thus, respective reaction liquids were prepared. In Table 1, the term "CATIOMASTER PDT-2" represents the product name of an amine-epichlorohydrin condensation-type polymer aqueous solution (cationic resin content: 60.0%) manufactured by Yokkaichi Chemical Co., Ltd. The term "ACETYLENOL E100" shown in Table 1 represents the product name of a surfactant manufactured by Kawaken Fine Chemicals Co., Ltd.

TABLE 1

Compositions of reaction liquids

| | Reaction liquid | | | |
|---|---|---|---|---|
| | 1 | 2 | 3 | 4 |
| Magnesium sulfate heptahydrate | 10.00 | | | |
| Calcium nitrate tetrahydrate | | 10.00 | | |
| Glutaric acid | | | 10.00 | |
| CATIOMASTER PDT-2 | | | | 1.70 |
| Glycerin | 15.00 | 15.00 | 15.00 | 15.00 |
| ACETYLENOL E100 | 1.00 | 1.00 | 1.00 | 1.00 |
| Ion-exchanged water | 74.00 | 74.00 | 74.00 | 82.30 |

<Preparation of Pigment Dispersion Liquids>

(Pigment Dispersion Liquid 1)

1.5 Grams of 4-aminophthalic acid was added to a solution obtained by dissolving 5.0 g of concentrated hydrochloric acid in 5.5 g of ion-exchanged water under a state in which the solution was cooled to 5° C. Next, a container containing the solution was loaded into an ice bath and a state in which the temperature of the solution was always kept at 10° C. or less was established by stirring the solution. A solution obtained by dissolving 0.9 g of sodium nitrite in 9.0 g of ion-exchanged water at 5° C. was added to the solution. The resultant solution was further stirred for 15 minutes and then 6.0 g of a pigment (carbon black) was added thereto under stirring. After that, the mixture was further stirred for 15 minutes. The resultant slurry was filtered with filter paper (product name: STANDARD FILTER PAPER No. 2; manufactured by Advantec) and then its particle was sufficiently washed with water, followed by drying in an oven at 110° C. After that, a sodium ion was substituted with a potassium ion by an ion exchange method to prepare a self-dispersible pigment in which a —$C_6H_4$—$(COOK)_2$ group was bonded to the surface of a pigment particle. An appropriate amount of ion-exchanged water was added to the self-dispersible pigment to provide a pigment dispersion liquid 1. The content of the pigment (carbon black) in the pigment dispersion liquid 1 was 20.0%.

(Pigment Dispersion Liquid 2)

A self-dispersible pigment was prepared by the same procedure as that of the above-mentioned method of preparing the pigment dispersion liquid 1 except that the pigment was changed to C.I. Pigment Blue 15:3. An appropriate amount of ion-exchanged water was added to the self-dispersible pigment to provide a pigment dispersion liquid 2 in which the content of the pigment (C.I. Pigment Blue 15:3) was 20.0%.

(Pigment Dispersion Liquid 3)

A styrene-ethyl acrylate-acrylic acid copolymer (resin 1) having an acid value of 150 mgKOH/g and a weight-average molecular weight of 8,000 was prepared. 20.0 Parts of the resin 1 was neutralized with potassium hydroxide whose molar amount was equivalent to the acid value, followed by the addition of an appropriate amount of pure water. Thus, an aqueous solution of the resin 1 in which the content of the resin (solid content) was 20.0% was prepared. 10.0 Parts of a pigment (C.I. PigmentBlue 15:3), 15.0 parts of the aqueous solution of the resin 1 and 75.0 parts of pure water were mixed to provide a mixture. The resultant mixture and 200 parts of zirconia beads each having a diameter of 0.3 mm were loaded into a batch-type vertical sand mill (manufactured by AIMEX Co., Ltd.) and were dispersed for 5 hours while being cooled with water. The dispersed product was centrifuged so that a coarse particle was removed, followed by filtration with a cellulose acetate filter having a pore size of 3.0 μm (manufactured by Advantec) under pressure. Thus, a pigment dispersion liquid 3 in which the content of the pigment (C.I. Pigment Blue 15:3) was 20.0% and the content of the resin dispersant (resin 1) was 10.0% was prepared.

(Pigment Dispersion Liquid 4)

A pigment dispersion liquid 4 in which the content of a pigment (solid solution pigment of C.I. Pigment Violet 19 and C.I. Pigment Red 122) was 20.0% and the content of the resin dispersant (resin 1) was 10.0% was prepared by the same procedure as that of the above-mentioned method of preparing the pigment dispersion liquid 3 except that the pigment was changed to the solid solution pigment of C.I. Pigment Violet 19 and C.I. Pigment Red 122.

(Pigment Dispersion Liquid 5)

A pigment dispersion liquid 5 in which the content of a pigment (C.I. Pigment Red 150) was 20.0% and the content of the resin dispersant (resin 1) was 10.0% was prepared by the same procedure as that of the above-mentioned method of preparing the pigment dispersion liquid 3 except that the pigment was changed to C.I. Pigment Red 150.

(Pigment Dispersion Liquid 6)

A pigment dispersion liquid 6 in which the content of a pigment (C.I. Pigment Yellow 74) was 20.0% and the content of the resin dispersant (resin 1) was 10.0% was prepared by the same procedure as that of the above-mentioned method of preparing the pigment dispersion liquid 3 except that the pigment was changed to C.I. Pigment Yellow 74.

(Pigment Dispersion Liquid 7)

A pigment dispersion liquid 7 in which the content of a pigment (carbon black) was 20.0% and the content of the resin dispersant (resin 1) was 10.0% was prepared by the same procedure as that of the above-mentioned method of preparing the pigment dispersion liquid 3 except that the pigment was changed to carbon black.

<Preparation of Dispersants>

Dispersants 1 to 16 described below were prepared as dispersants for dispersing waxes. The terms "EO number" and "PO number" in the following nonionic dispersants refer to the numbers of moles added (numbers of repeating units) of ethylene oxide and propylene oxide, respectively.

Dispersant 1: nonionic dispersant; polyoxypropylene butyl ether (PO number: 4, HLB value: 11.5)

Dispersant 2: nonionic dispersant; polyoxypropylene cetyl ether (PO number: 10, HLB value: 10.0)

Dispersant 3: nonionic dispersant; polyoxyethylene cetyl ether (EO number: 8, HLB value: 11.9)

Dispersant 4: nonionic dispersant; polyoxyethylene cetyl ether (EO number: 10, HLB value: 12.9)

Dispersant 5: nonionic dispersant; polyoxyethylene cetyl ether (EO number: 20, HLB value: 15.7)

Dispersant 6: nonionic dispersant; polyoxyethylene oleyl ether (EO number: 30, HLB value: 16.6)

Dispersant 7: nonionic dispersant; polyoxyethylene behenyl ether (EO number: 20, HLB value: 14.6)

Dispersant 8: nonionic dispersant; polyoxyethylene behenyl ether (EO number: 6, HLB value: 9.0)

Dispersant 9: nonionic dispersant; polyoxyethylene cetyl ether (EO number: 4, HLB value: 8.4)

Dispersant 10: nonionic dispersant; polyoxyethylene cetyl ether (EO number: 50, HLB value: 18.0)

Dispersant 11: nonionic dispersant; polyoxyethylene myristyl ether (EO number: 50, HLB value: 18.2)

Dispersant 12: anionic dispersant; polyoxyethylene alkyl ether sulfuric acid ester salt (product name: "Newcol 2320-SN", manufactured by Nippon Nyukazai Co., Ltd.)

Dispersant 13: anionic dispersant; polyoxyethylene alkyl ether phosphoric acid salt (product name: "NIKKOL DDP-8", manufactured by Nikko Chemicals Co., Ltd.)

Dispersant 14: anionic dispersant; potassium montanate

Dispersant 15: anionic dispersant; isomerized linoleic acid (linoleic acid having a conjugated structure, CAS number: 67701-06-8)

Dispersant 16: anionic dispersant; ethylene-acrylic acid copolymer (Method of Preparing Dispersant 16)

A copolymer formed of ethylene and acrylic acid was synthesized by an ordinary method and was neutralized with a neutralizer whose molar amount was equivalent to its acid value. In addition, ion-exchanged water was evaporated to dryness under reduced pressure. Thus, the solid dispersant 16 was obtained. The dispersant 16 had an acid value of 120 mgKOH/g and a weight-average molecular weight of 8,000.

<Preparation of Water Dispersion Liquids of Wax Particles>

Respective components (unit: part(s)) shown in Tables 2 (Tables 2-1 to 2-3) were mixed, followed by appropriate adjustment of a temperature and a pressure to disperse waxes. Thus, wax-dispersed bodies each having a predetermined particle diameter were prepared. Then, an appropriate amount of pure water was added to the dispersed bodies to prepare water dispersion liquids 1 to 32 of wax particles in each of which the total content of a wax and a dispersant was 35.0%. The water dispersion liquid 30 was prepared without incorporation of a wax.

Details about wax particles 1 to 4 shown in Tables 2 are described below.

Wax particle 1: polyethylene wax (melting point: 90° C.)

Wax particle 2: oxidized polyolefin wax (melting point: 100° C.)

Wax particle 3: Fischer-Tropsch wax (melting point: 90° C.)

Wax particle 4: paraffin wax (melting point: 70° C.)

TABLE 2-1

Composition of water dispersion of wax particle (parts)

| | Water dispersion of wax particle | | | | | | | | | | |
|---|---|---|---|---|---|---|---|---|---|---|---|
| | 1 | 2 | 3 | 4 | 5 | 6 | 7 | 8 | 9 | 10 | 11 |
| Wax particle 1 | 14.50 | 29.00 | | | 14.50 | 14.50 | 14.50 | 14.50 | 14.50 | 14.50 | 14.50 |
| Wax particle 2 | 14.50 | | | | 14.50 | 14.50 | 14.50 | 14.50 | 14.50 | 14.50 | 14.50 |
| Wax particle 3 | | | 29.00 | | | | | | | | |
| Wax particle 4 | | | | 29.00 | | | | | | | |
| Dispersant 1 | | | | | | | | | | | |
| Dispersant 2 | | | | | | | | | | | 5.00 |
| Dispersant 3 | | | | | | | | | | | |
| Dispersant 4 | 5.00 | 5.00 | 5.00 | 5.00 | 2.50 | | | | | | |
| Dispersant 5 | | | | | | 5.00 | | | | | |
| Dispersant 6 | | | | | 2.50 | | 5.00 | | | | |
| Dispersant 7 | | | | | | | | 5.00 | | | |
| Dispersant 8 | | | | | | | | | 5.00 | | |
| Dispersant 9 | | | | | | | | | | | |
| Dispersant 10 | | | | | | | | | | 5.00 | |
| Dispersant 11 | | | | | | | | | | | |
| Dispersant 12 | | | | | | | | | | | |
| Dispersant 13 | | | | | | | | | | | |
| Dispersant 14 | | | | | | | | | | | |
| Dispersant 15 | | | | | | | | | | | |
| Dispersant 16 | 1.00 | 1.00 | 1.00 | 1.00 | 1.00 | 1.00 | 1.00 | 1.00 | 1.00 | 1.00 | 1.00 |

TABLE 2-2

Composition of water dispersion of wax particle (parts)

| | Water dispersion of wax particle | | | | | | | | | | |
|---|---|---|---|---|---|---|---|---|---|---|---|
| | 12 | 13 | 14 | 15 | 16 | 17 | 18 | 19 | 20 | 21 | 22 |
| Wax particle 1 | 14.50 | 14.50 | 14.50 | 14.50 | 14.50 | 14.50 | 14.50 | 14.50 | 14.50 | 14.50 | 14.50 |
| Wax particle 2 | 14.50 | 14.50 | 14.50 | 14.50 | 14.50 | 14.50 | 14.50 | 14.50 | 14.50 | 14.50 | 14.50 |
| Wax particle 3 | | | | | | | | | | | |
| Wax particle 4 | | | | | | | | | | | |
| Dispersant 1 | | | | | | | | | | | |
| Dispersant 2 | | | | | | | | | | | |
| Dispersant 3 | | | 5.00 | | | | | | | | |
| Dispersant 4 | 5.00 | 5.00 | | 3.60 | 3.80 | 8.50 | 12.10 | 12.60 | 12.00 | 9.20 | 6.80 |
| Dispersant 5 | | | | | | | | | | | |
| Dispersant 6 | | | | | | | | | | | |
| Dispersant 7 | | | | | | | | | | | |
| Dispersant 8 | | | | | | | | | | | |
| Dispersant 9 | | | | | | | | | | | |
| Dispersant 10 | | | | | | | | | | | |
| Dispersant 11 | | | | | | | | | | | |
| Dispersant 12 | 1.00 | | | | | | | | | | |
| Dispersant 13 | | 1.00 | | | | | | | | | |
| Dispersant 14 | | | | | | | | | | | |
| Dispersant 15 | | | | | | | | | | | |
| Dispersant 16 | | | 1.00 | 0.40 | 0.50 | 1.70 | 2.40 | 2.50 | 1.10 | 0.90 | 3.40 |

TABLE 2-3

Composition of water dispersion of wax particle (parts)

| | Water dispersion of wax particle | | | | | | | | | |
|---|---|---|---|---|---|---|---|---|---|---|
| | 23 | 24 | 25 | 26 | 27 | 28 | 29 | 30 | 31 | 32 |
| Wax particle 1 | 14.50 | 14.50 | 14.50 | 14.50 | 14.50 | 14.50 | 14.50 | | 14.50 | 14.50 |
| Wax particle 2 | 14.50 | 14.50 | 14.50 | 14.50 | 14.50 | 14.50 | 14.50 | | 14.50 | 14.50 |
| Wax particle 3 | | | | | | | | | | |
| Wax particle 4 | | | | | | | | | | |
| Dispersant 1 | | | | | 14.00 | | | | | |
| Dispersant 2 | | | | | | | | | | |
| Dispersant 3 | | | | | | | | | | |

TABLE 2-3-continued

| | Composition of water dispersion of wax particle (parts) | | | | | | | | | |
|---|---|---|---|---|---|---|---|---|---|---|
| | Water dispersion of wax particle | | | | | | | | | |
| | 23 | 24 | 25 | 26 | 27 | 28 | 29 | 30 | 31 | 32 |
| Dispersant 4 | 4.50 | 5.00 | 5.00 | 5.00 | | 5.00 | | 5.00 | | |
| Dispersant 5 | | | | | | | | | | |
| Dispersant 6 | | | | | | | | | | |
| Dispersant 7 | | | | | | | | | | |
| Dispersant 8 | | | | | | | | | | |
| Dispersant 9 | | | | | | | | | 5.00 | |
| Dispersant 10 | | | | | | | | | | |
| Dispersant 11 | | | | | | | | | | 5.00 |
| Dispersant 12 | | | | | 1.20 | | | | | |
| Dispersant 13 | | | | | | | | | | |
| Dispersant 14 | | 1.00 | | | | | | | | |
| Dispersant 15 | | | 1.00 | | | | | | | |
| Dispersant 16 | 2.30 | | | 1.00 | | | 1.00 | 1.00 | 1.00 | 1.00 |

<Preparation of Ink>

Respective components (unit: %) shown in the middle column of Table 3 (Table 3-1 to 3-4) were mixed and sufficiently stirred, followed by filtration with a cellulose acetate filter having a pore size of 3.0 μm (manufactured by Advantec) under pressure. Products whose numbers were shown in the upper sections of Tables 3 were used as a water dispersion liquid of a wax particle. The static surface tensions (mN/m) of the inks at 25° C. were shown as ink characteristics in the lower sections of Tables 3. In addition, the total content (%) of the wax and the dispersants, the content A (%) of the wax, the content B (%) of the nonionic dispersant and the content C (%) of the anionic dispersant with respect to the total mass of each of the inks and the value of "(B+C)/A" (times) and the value of "C/B" (times) were shown.

TABLE 3-1

| | Composition and Property of Inks | | | | | | | | | | |
|---|---|---|---|---|---|---|---|---|---|---|---|
| | Ink | | | | | | | | | | |
| | 1 | 2 | 3 | 4 | 5 | 6 | 7 | 8 | 9 | 10 | 11 |
| Type of water dispersion of wax particle | 1 | 1 | 1 | 1 | 1 | 1 | 2 | 3 | 4 | 5 | 6 |
| Pigment dispersion liquid 1 | 20.00 | | | | | | | | | | |
| Pigment dispersion liquid 2 | | 20.00 | | | | | | | | | |
| Pigment dispersion liquid 3 | | | 20.00 | | | | 20.00 | 20.00 | 20.00 | 20.00 | 20.00 |
| Pigment dispersion liquid 4 | | | | 15.00 | | | | | | | |
| Pigment dispersion liquid 5 | | | | 5.00 | | | | | | | |
| Pigment dispersion liquid 6 | | | | | 20.00 | | | | | | |
| Pigment dispersion liquid 7 | | | | | | 20.00 | | | | | |
| Water dispersion of wax particle | 8.60 | 8.60 | 8.60 | 8.60 | 8.60 | 8.60 | 8.60 | 8.60 | 8.60 | 8.60 | 8.60 |
| Dispersant 4 | | | | | | | | | | | |
| Dispersant 12 | | | | | | | | | | | |
| Glycerin | 5.00 | 5.00 | 5.00 | 5.00 | 5.00 | 5.00 | 5.00 | 5.00 | 5.00 | 5.00 | 5.00 |
| Triethyleneglycol | 5.00 | 5.00 | 5.00 | 5.00 | 5.00 | 5.00 | 5.00 | 5.00 | 5.00 | 5.00 | 5.00 |
| 1,2-Hexanediol | 3.00 | 3.00 | 3.00 | 3.00 | 3.00 | 3.00 | 3.00 | 3.00 | 3.00 | 3.00 | 3.00 |
| ACETYLENOL E100 | 1.00 | 1.00 | 1.00 | 1.00 | 1.00 | 1.00 | 1.00 | 1.00 | 1.00 | 1.00 | 1.00 |
| Ion-exchanged water | 57.40 | 57.40 | 57.40 | 57.40 | 57.40 | 57.40 | 57.40 | 57.40 | 57.40 | 57.40 | 57.40 |
| Static surface tension (mN/m) | 33 | 33 | 33 | 33 | 33 | 33 | 33 | 33 | 33 | 33 | 33 |
| Total content of Wax and dispersant (%) | 3.01 | 3.01 | 3.01 | 3.01 | 3.01 | 3.01 | 3.01 | 3.01 | 3.01 | 3.01 | 3.01 |
| Content of Wax A (%) | 2.49 | 2.49 | 2.49 | 2.49 | 2.49 | 2.49 | 2.49 | 2.49 | 2.49 | 2.49 | 2.49 |
| Content of Nonionic dispersant B (%) | 0.43 | 0.43 | 0.43 | 0.43 | 0.43 | 0.43 | 0.43 | 0.43 | 0.43 | 0.43 | 0.43 |
| Content of Anionic dispersant C (%) | 0.09 | 0.09 | 0.09 | 0.09 | 0.09 | 0.09 | 0.09 | 0.09 | 0.09 | 0.09 | 0.09 |
| Value of (B + C)/A (times) | 0.21 | 0.21 | 0.21 | 0.21 | 0.21 | 0.21 | 0.21 | 0.21 | 0.21 | 0.21 | 0.21 |
| Value of C/B (times) | 0.21 | 0.21 | 0.21 | 0.21 | 0.21 | 0.21 | 0.21 | 0.21 | 0.21 | 0.21 | 0.21 |

TABLE 3-2

Composition and Property of Inks

| | Ink | | | | | | | | | | | |
|---|---|---|---|---|---|---|---|---|---|---|---|---|
| | 12 | 13 | 14 | 15 | 16 | 17 | 18 | 19 | 20 | 21 | 22 | 23 |
| Type of water dispersion of wax particle | 7 | 8 | 9 | 10 | 11 | 12 | 13 | 14 | 15 | 16 | 17 | 18 |
| Pigment dispersion liquid 1 | | | | | | | | | | | | |
| Pigment dispersion liquid 2 | | | | | | | | | | | | |
| Pigment dispersion liquid 3 | 20.00 | 20.00 | 20.00 | 20.00 | 20.00 | 20.00 | 20.00 | 20.00 | 20.00 | 20.00 | 20.00 | 20.00 |
| Pigment dispersion liquid 4 | | | | | | | | | | | | |
| Pigment dispersion liquid 5 | | | | | | | | | | | | |
| Pigment dispersion liquid 6 | | | | | | | | | | | | |
| Pigment dispersion liquid 7 | | | | | | | | | | | | |
| Water dispersion of wax particle | 8.60 | 8.60 | 8.60 | 8.60 | 8.60 | 8.60 | 8.60 | 8.60 | 8.70 | 8.60 | 7.70 | 6.90 |
| Dispersant 4 | | | | | | | | | | | | |
| Dispersant 12 | | | | | | | | | | | | |
| Glycerin | 5.00 | 5.00 | 5.00 | 5.00 | 5.00 | 5.00 | 5.00 | 5.00 | 5.00 | 5.00 | 5.00 | 5.00 |
| Triethyleneglycol | 5.00 | 5.00 | 5.00 | 5.00 | 5.00 | 5.00 | 5.00 | 5.00 | 5.00 | 5.00 | 5.00 | 5.00 |
| 1,2-Hexanediol | 3.00 | 3.00 | 3.00 | 3.00 | 3.00 | 3.00 | 3.00 | 3.00 | 3.00 | 3.00 | 3.00 | 3.00 |
| ACETYLENOL E100 | 1.00 | 1.00 | 1.00 | 1.00 | 1.00 | 1.00 | 1.00 | 1.00 | 1.00 | 1.00 | 1.00 | 1.00 |
| Ion-exchanged water | 57.40 | 57.40 | 57.40 | 57.40 | 57.40 | 57.40 | 57.40 | 57.40 | 57.30 | 57.40 | 58.30 | 59.10 |
| Static surface tension (mN/m) | 33 | 33 | 33 | 33 | 35 | 35 | 35 | 35 | 33 | 33 | 33 | 33 |
| Total content of Wax and dispersant (%) | 3.01 | 3.01 | 3.01 | 3.01 | 3.01 | 3.01 | 3.01 | 3.01 | 3.05 | 3.01 | 2.70 | 2.42 |
| Content of Wax A (%) | 2.49 | 2.49 | 2.49 | 2.49 | 2.49 | 2.49 | 2.49 | 2.49 | 2.68 | 2.62 | 1.99 | 1.61 |
| Content of Nonionic dispersant B (%) | 0.43 | 0.43 | 0.43 | 0.43 | 0.43 | 0.43 | 0.43 | 0.43 | 0.33 | 0.34 | 0.58 | 0.67 |
| Content of Anionic dispersant C (%) | 0.09 | 0.09 | 0.09 | 0.09 | 0.09 | 0.09 | 0.09 | 0.09 | 0.04 | 0.05 | 0.12 | 0.13 |
| Value of (B + C)/A (times) | 0.21 | 0.21 | 0.21 | 0.21 | 0.21 | 0.21 | 0.21 | 0.21 | 0.14 | 0.15 | 0.35 | 0.50 |
| Value of C/B (times) | 0.21 | 0.21 | 0.21 | 0.21 | 0.21 | 0.21 | 0.21 | 0.21 | 0.12 | 0.15 | 0.21 | 0.19 |

TABLE 3-3

Composition and Property of Inks

| | Ink | | | | | | | | | |
|---|---|---|---|---|---|---|---|---|---|---|
| | 24 | 25 | 26 | 27 | 28 | 29 | 30 | 31 | 32 | 33 |
| Type of water dispersion of wax particle | 19 | 20 | 21 | 22 | 23 | 24 | 25 | 26 | 1 | 1 |
| Pigment dispersion liquid 1 | | | | | | | | | | |
| Pigment dispersion liquid 2 | | | | | | | | | | |
| Pigment dispersion liquid 3 | 20.00 | 20.00 | 20.00 | 20.00 | 20.00 | 20.00 | 20.00 | 20.00 | 20.00 | 20.00 |
| Pigment dispersion liquid 4 | | | | | | | | | | |
| Pigment dispersion liquid 5 | | | | | | | | | | |
| Pigment dispersion liquid 6 | | | | | | | | | | |
| Pigment dispersion liquid 7 | | | | | | | | | | |
| Water dispersion of wax particle | 6.80 | 7.10 | 7.70 | 7.70 | 8.40 | 8.60 | 8.60 | 8.60 | 1.40 | 1.43 |
| Dispersant 4 | | | | | | | | | | |
| Dispersant 12 | | | | | | | | | | |
| Glycerin | 5.00 | 5.00 | 5.00 | 5.00 | 5.00 | 5.00 | 5.00 | 5.00 | 5.00 | 5.00 |
| Triethyleneglycol | 5.00 | 5.00 | 5.00 | 5.00 | 5.00 | 5.00 | 5.00 | 5.00 | 5.00 | 5.00 |
| 1,2-Hexanediol | 3.00 | 3.00 | 3.00 | 3.00 | 3.00 | 3.00 | 3.00 | 3.00 | 3.00 | 3.00 |
| ACETYLENOL E100 | 1.00 | 1.00 | 1.00 | 1.00 | 1.00 | 1.00 | 1.00 | 0.50 | 1.00 | 1.00 |
| Ion-exchanged water | 59.20 | 58.90 | 58.30 | 58.30 | 57.60 | 57.40 | 57.40 | 57.90 | 64.60 | 64.57 |
| Static surface tension (mN/m) | 33 | 35 | 33 | 33 | 35 | 35 | 35 | 36 | 33 | 33 |
| Total content of Wax and dispersant (%) | 2.38 | 2.49 | 2.70 | 2.70 | 2.94 | 3.01 | 3.01 | 3.01 | 0.49 | 0.50 |
| Content of Wax A (%) | 1.57 | 1.71 | 2.00 | 1.99 | 2.38 | 2.49 | 2.49 | 2.49 | 0.41 | 0.41 |
| Content of Nonionic dispersant B (%) | 0.68 | 0.71 | 0.63 | 0.47 | 0.37 | 0.43 | 0.43 | 0.43 | 0.07 | 0.07 |
| Content of Anionic dispersant C (%) | 0.13 | 0.06 | 0.06 | 0.23 | 0.19 | 0.09 | 0.09 | 0.09 | 0.01 | 0.01 |
| Value of (B + C)/A (times) | 0.52 | 0.45 | 0.35 | 0.35 | 0.24 | 0.21 | 0.21 | 0.21 | 0.20 | 0.20 |
| Value of C/B (times) | 0.19 | 0.08 | 0.10 | 0.49 | 0.51 | 0.21 | 0.21 | 0.21 | 0.14 | 0.14 |

TABLE 3-4

Composition and Property of Inks

| | Ink | | | | | | | | | |
|---|---|---|---|---|---|---|---|---|---|---|
| | 34 | 35 | 36 | 37 | 38 | 39 | 40 | 41 | 42 | 43 |
| Type of water dispersion of wax particle | 1 | 1 | 27 | 28 | 29 | 30 | 28 | 29 | 31 | 32 |
| Pigment dispersion liquid 1 | | | | | | | | | | |
| Pigment dispersion liquid 2 | | | | | | | | | | |
| Pigment dispersion liquid 3 | 20.00 | 20.00 | 20.00 | 20.00 | 20.00 | 20.00 | 20.00 | 20.00 | 20.00 | 20.00 |
| Pigment dispersion liquid 4 | | | | | | | | | | |
| Pigment dispersion liquid 5 | | | | | | | | | | |
| Pigment dispersion liquid 6 | | | | | | | | | | |
| Pigment dispersion liquid 7 | | | | | | | | | | |
| Water dispersion of wax particle | 25.71 | 25.75 | 1.40 | 8.80 | 10.00 | 50.00 | 8.80 | 10.00 | 8.60 | 8.60 |
| Dispersant 4 | | | | | | | | 0.50 | | |
| Dispersant 12 | | | | | | | 0.10 | | | |
| Glycerin | 5.00 | 5.00 | 5.00 | 5.00 | 5.00 | 5.00 | 5.00 | 5.00 | 5.00 | 5.00 |
| Triethyleneglycol | 5.00 | 5.00 | 5.00 | 5.00 | 5.00 | 5.00 | 5.00 | 5.00 | 5.00 | 5.00 |
| 1,2-Hexanediol | 3.00 | 3.00 | 3.00 | 3.00 | 3.00 | 3.00 | 3.00 | 3.00 | 3.00 | 3.00 |
| ACETYLENOL E100 | 1.00 | 1.00 | 0.50 | 1.00 | 1.00 | 1.00 | 1.00 | 1.00 | 1.00 | 1.00 |
| Ion-exchanged water | 40.29 | 40.25 | 65.10 | 57.20 | 56.00 | 16.00 | 57.10 | 55.50 | 57.40 | 57.40 |
| Static surface tension (mN/m) | 33 | 33 | 36 | 33 | 33 | 33 | 33 | 33 | 33 | 33 |
| Total content of Wax and dispersant (%) | 9.00 | 9.01 | 0.49 | 3.08 | 3.50 | 17.50 | 3.08 | 3.50 | 3.01 | 3.01 |
| Content of Wax A (%) | 7.46 | 7.47 | 0.32 | 2.63 | 3.38 | 0.00 | 2.63 | 3.38 | 2.49 | 2.49 |
| Content of Nonionic dispersant B (%) | 1.29 | 1.29 | 0.16 | 0.45 | 0.00 | 14.59 | 0.45 | 0.50 | 0.43 | 0.43 |
| Content of Anionic dispersant C (%) | 0.26 | 0.26 | 0.01 | 0.00 | 0.12 | 2.92 | 0.10 | 0.12 | 0.09 | 0.09 |
| Value of (B + C)/A (times) | 0.21 | 0.21 | 0.53 | 0.17 | 0.04 | — | 0.21 | 0.18 | 0.21 | 0.21 |
| Value of C/B (times) | 0.20 | 0.20 | 0.06 | 0.00 | — | 0.20 | 0.22 | 0.24 | 0.21 | 0.21 |

<Evaluation>

A reaction liquid (see Table 1) and an ink (see Tables 3) whose kinds were shown in Table 4-1 and 4-2 were loaded into the reaction liquid applying device 1201 and ink applying device 1202 of the ink jet recording apparatus 100 having a configuration illustrated in FIG. 1, respectively. When no reaction liquid was applied, no reaction liquid was loaded into the reaction liquid applying device 1201. When the reaction liquid was applied to a recording medium with the ink jet recording apparatus 100, a solid image measuring 1.6 cm by 10 cm, the image having a reaction liquid recording duty of 7.5% and an ink recording duty of 75%, was recorded on the recording medium. When no reaction liquid was applied to a recording medium with the ink jet recording apparatus 100, a solid image measuring 1.6 cm by 10 cm, the image having an ink recording duty of 75%, was recorded on the recording medium. A time difference from the application of the reaction liquid to the application of the ink was adjusted to 100 milliseconds by adjusting the operating speed of the conveying member 1300. Coated paper (product name: "OK TOP COAT+", manufactured by Oji Paper Co., Ltd.) was used as the recording medium.

In this Example, an image recorded under the following conditions is defined as having a recording duty of 100%: 4 ink droplets each having a mass of 4.0 ng are applied to a unit region measuring 1/600 inch by 1/600 inch. In this Example, in evaluation criteria for each of the following items, while levels "AA", "A" and "B" were defined as acceptable levels, a level "C" was defined as an unacceptable level. The evaluation results are shown in the evaluation columns of Table 4-1 and 4-2. In Comparative Example 3, in the evaluation of a change in glossy feeling to be described later, the solid image peeled from the recording medium after the image and the recording medium had been rubbed against each other. Accordingly, the evaluation of a change in glossy feeling was not performed and the symbol "-" was shown in the column "Change in glossy feeling" of Table 4-2.

(Suppression of Change in Glossy Feeling)

After the lapse of 10 minutes from the completion of the recording, on the recorded solid image, a recording medium on which no image had been recorded (the same recording medium (white ground) as that used in the recording) and a weight having a surface pressure of 80 g/cm$^2$ were mounted, followed by repeated rubbing of the recorded solid image and the white ground recording medium against each other five times. After that, the white ground recording medium and the weight that had been mounted were removed and the solid image was visually observed, followed by the evaluation of a change in glossy feeling of the image in accordance with the following evaluation criteria.

AA: No change in glossy feeling of the solid image occurred.

A: A change in glossy feeling of the solid image occurred but occurred in 5% or less of the entirety of the solid image.

B: A change in glossy feeling of the solid image occurred but occurred in more than 5% to 50% or less of the entirety of the solid image.

C: A change in glossy feeling of the solid image was at a level causing a problem because the change occurred in more than 50% of the entirety of the solid image.

(Abrasion Resistance)

The recorded image was placed under an environment at 25° C. and a relative humidity of 55% for 1 hour. After that, the surface of the recorded image was rubbed with a friction resistance tester (product name: "AB-301", manufactured by Tester Sangyo Co., Ltd.) that was a friction tester II (Gakushin-type) in conformity with JIS L0849 at a load of 80 g five times. A recording medium of the same kind as that of the recording medium having recorded thereon the image was bonded as evaluation recording paper to a friction block portion. The surface of the image and the surface of the evaluation recording paper after the friction test were visually observed, followed by the evaluation of the abrasion resistance of the image in accordance with the following evaluation criteria.

AA: The image was fixed to the recording medium to preclude the observation of the white ground of the recording medium and no contamination was present on the evaluation recording paper.

A: The image was fixed to the recording medium to preclude the observation of the white ground of the recording medium and no contamination was present on the evaluation recording paper at the time point when the rubbing was performed once. However, contamination was present on the evaluation recording paper after the rubbing had been performed five times.

B: The image was fixed to the recording medium to preclude the observation of the white ground of the recording medium but contamination was present on the evaluation recording paper at the time point when the rubbing was performed once.

C: The image peeled from the recording medium to show the white ground of the recording medium.

TABLE 4-1

Conditions and results of Evaluation

| | | Type of reaction liquid | Type of Ink | Evalutation result Suppression of gloss feeling change | Abrasion resistance |
|---|---|---|---|---|---|
| Example | 1 | 1 | 1 | AA | AA |
| | 2 | 1 | 2 | AA | AA |
| | 3 | 1 | 3 | AA | AA |
| | 4 | 1 | 4 | AA | AA |
| | 5 | 1 | 5 | AA | AA |
| | 6 | 1 | 6 | AA | AA |
| | 7 | 2 | 1 | AA | AA |
| | 8 | 3 | 1 | AA | AA |
| | 9 | 4 | 1 | AA | AA |
| | 10 | None | 1 | AA | AA |
| | 11 | 1 | 7 | AA | AA |
| | 12 | 1 | 8 | AA | AA |
| | 13 | 1 | 9 | AA | AA |
| | 14 | 1 | 10 | AA | AA |
| | 15 | 1 | 11 | AA | AA |
| | 16 | 1 | 12 | AA | AA |
| | 17 | 1 | 13 | AA | AA |
| | 18 | 1 | 14 | A | AA |
| | 19 | 1 | 15 | AA | AA |
| | 20 | 1 | 16 | A | AA |
| | 21 | 1 | 17 | A | AA |
| | 22 | 1 | 18 | A | AA |
| | 23 | 1 | 19 | A | AA |
| | 24 | 1 | 20 | A | AA |
| | 25 | 1 | 21 | AA | AA |

TABLE 4-2

Conditions and results of Evaluation

| | | Type of reaction liquid | Type of Ink | Evalutation result Suppression of gloss feeling change | Abrasion resistance |
|---|---|---|---|---|---|
| Example | 26 | 1 | 22 | AA | AA |
| | 27 | 1 | 23 | AA | AA |
| | 28 | 1 | 24 | A | AA |
| | 29 | 1 | 25 | A | AA |
| | 30 | 1 | 26 | AA | AA |
| | 31 | 1 | 27 | AA | AA |
| | 32 | 1 | 28 | A | AA |
| | 33 | 1 | 29 | A | AA |
| | 34 | 1 | 30 | A | AA |
| | 35 | 1 | 31 | A | AA |
| | 36 | 1 | 32 | A | B |
| | 37 | 1 | 33 | A | AA |
| | 38 | 1 | 34 | A | AA |
| | 39 | 1 | 35 | A | A |
| | 40 | 1 | 36 | B | B |
| Comparative example | 1 | 1 | 37 | A | C |
| | 2 | 1 | 38 | C | A |
| | 3 | 1 | 39 | — | C |
| | 4 | 1 | 40 | C | A |
| | 5 | 1 | 41 | C | A |
| | 6 | 1 | 42 | C | A |
| | 7 | 1 | 43 | C | A |

According to the present invention, the present invention can provide an aqueous ink for ink jet capable of recording an image, which has abrasion resistance required in a commercial printing field and an industrial printing field and which is suppressed from being changed in glossy feeling when recorded matters are loaded and their recorded surfaces are rubbed against each other. In addition, according to the present invention, the ink jet recording method and the ink jet recording apparatus using the aqueous ink can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-167228, filed Oct. 18, 2022, and Japanese Patent Application No. 2023-160082, filed Sep. 25, 2023, which are hereby incorporated by reference herein in their entirety.

What is claimed is:

1. An aqueous ink for ink jet comprising a wax, (i) a nonionic dispersant for dispersing the wax, and (ii) an anionic dispersant for dispersing the wax,
wherein the nonionic dispersant comprises a compound represented by the following general formula (1) and has a HLB value of 9.0 or more to 18.0 or less, and
wherein the anionic dispersant comprises a compound having at least one kind of anionic group selected from the group consisting of: a sulfonic acid group; a carboxylic acid group; and a phosphoric acid group:

$$R^1\text{—}O\text{—}(R^2O)_n\text{—}H \quad (1)$$

in the general formula (1), $R^1$ represents an alkyl group or an alkenyl group and the number of carbon atoms thereof is 4 or more to 40 or less, $R^2$s each independently represent an ethylene group, a propylene group or a butylene group and "n" represents the number of moles added of an alkylene oxide and represents 3 or more to 50 or less, and wherein a mass ratio of a content (% by mass) of the anionic dispersant in the aqueous ink to a content (% by mass) of the nonionic dispersant therein is 0.10 times or more to 0.50 times or less.

2. The aqueous ink according to claim 1, wherein the nonionic dispersant comprises a compound represented by the following general formula (2):

$$R^1\text{—}O\text{—}(C_2H_4O)_n\text{—}H \quad (2)$$

in the general formula (2), $R^1$ represents an alkyl group or an alkenyl group and the number of carbon atoms thereof is 4 or more to 40 or less and "n" represents the number of moles added of an alkylene oxide and represents 3 or more to 50 or less.

3. The aqueous ink according to claim 1, wherein the anionic group in the anionic dispersant comprises a carboxylic acid group.

4. The aqueous ink according to claim 1, wherein the number of moles added of the alkylene oxide in the nonionic dispersant is 10 or more.

5. The aqueous ink according to claim 4, wherein the number of moles added of the alkylene oxide in the nonionic dispersant is 40 or less.

6. The aqueous ink according to claim 1, wherein a mass ratio of a total content (% by mass) of the nonionic dispersant and the anionic dispersant in the aqueous ink to a content (% by mass) of the wax therein is 0.15 times or more to 0.50 times or less.

7. The aqueous ink according to claim 1, wherein the anionic dispersant comprises an ethylene-acrylic acid copolymer.

8. The aqueous ink according to claim 1, wherein the total content (% by mass) of the wax, the nonionic dispersant and the anionic dispersant in the ink is 0.50% by mass or more to 9.00% by mass or less.

9. The aqueous ink according to claim 1, wherein the aqueous ink has a static surface tension (mN/m) of 35 mN/m or less.

10. The aqueous ink according to claim 9, wherein the aqueous ink has the static surface tension (mN/m) of 25 mN/m or more.

11. An ink jet recording method of recording an image onto a recording medium by ejecting an ink from an ink jet recording head, wherein the ink comprises the aqueous ink of claim 1.

12. The ink jet recording method according to claim 11, wherein the recording head comprises a recording head for discharging the aqueous ink by the action of thermal energy.

13. The ink jet recording method according to claim 11, further comprising applying a reaction liquid which comprises a reactant that reacts with the aqueous ink to the recording medium before applying the aqueous ink to the recording medium.

14. The ink jet recording method according to claim 13, wherein the reactant comprises a magnesium nitrate.

15. An ink jet recording apparatus comprising:
an ink; and
a recording head of an ink jet system configured to eject the ink,
wherein the ink comprises the aqueous ink of claim 1.

16. The aqueous ink according to claim 1, wherein the nonionic dispersant comprises a polyoxyethylene cetyl ether.

17. The aqueous ink according to claim 1, wherein the wax comprises at least one kind selected from the group consisting of: a microcrystalline wax; a Fischer-Tropsch wax; a polyolefin wax; a paraffin wax; and modified products and blends thereof.

18. The aqueous ink according to claim 1, wherein a content (% by mass) of the wax in the aqueous ink is 0.30% by mass or more to 8.00% by mass or less with respect to the total mass of the ink.

19. The aqueous ink according to claim 1, wherein a content (% by mass) of the nonionic dispersant in the aqueous ink is 0.01% by mass or more to 2.50% by mass or less with respect to the total mass of the ink.

20. The aqueous ink according to claim 1, wherein a content (% by mass) of the anionic dispersant in the aqueous ink is 0.01% by mass or more to 2.50% by mass or less with respect to the total mass of the ink.

21. The aqueous ink according to claim 1, wherein the aqueous ink further comprises a coloring material.

22. The aqueous ink according to claim 21, wherein the content (% by mass) of the coloring material in the ink is 0.5% by mass or more to 15.0% by mass or less with respect to the total mass of the ink.

23. The aqueous ink according to claim 22, wherein the coloring material comprises a pigment.

24. The aqueous ink according to claim 23, wherein the pigment is a resin-dispersed pigment.

* * * * *